May 5, 1964  A. F. TOWNSEND ETAL  3,131,517
GRINDING MACHINE

Filed Dec. 13, 1961  23 Sheets-Sheet 1

INVENTORS
Almon F. Townsend
George H. Lockwood
Robert J. Hatstat
BY
Norman S. Blodgett
Attorney May 5, 1964   A. F. TOWNSEND ETAL   3,131,517
GRINDING MACHINE
Filed Dec. 13, 1961   23 Sheets-Sheet 2

INVENTORS
Almon F. Townsend
George H. Lockwood
Robert G. Hatstat
BY
Norman S. Blodgett
Attorney INVENTORS
Almon F. Townsend
George H. Lockwood
Robert J. Hatstat
BY
Norman S. Blodgett
Attorney May 5, 1964     A. F. TOWNSEND ETAL     3,131,517

GRINDING MACHINE

Filed Dec. 13, 1961     23 Sheets-Sheet 4

INVENTORS
Almon F. Townsend
George H. Lockwood
Robert G. Hatstat
BY
Norman S. Blodgett
Attorney

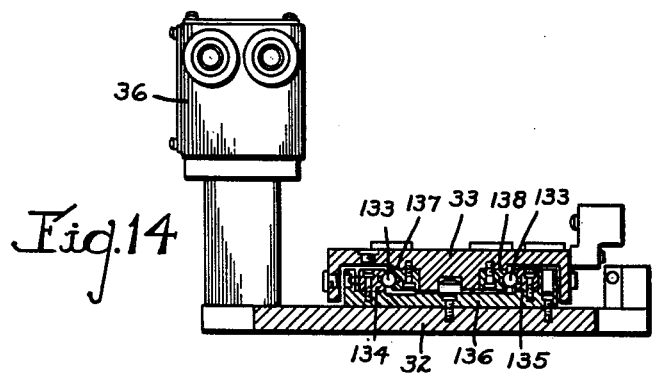
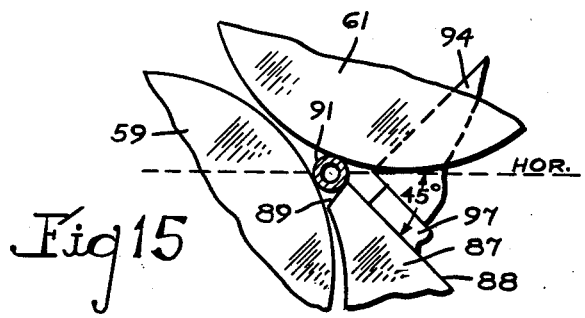
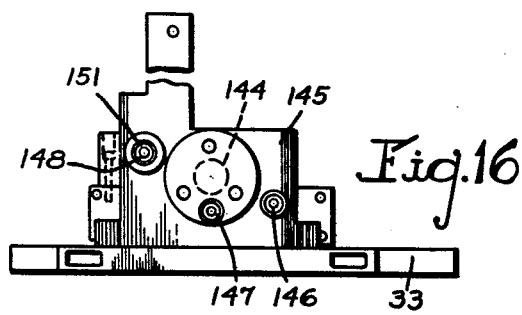

May 5, 1964  A. F. TOWNSEND ETAL  3,131,517
GRINDING MACHINE
Filed Dec. 13, 1961
23 Sheets-Sheet 8

INVENTORS
Almon F. Townsend
George H. Lockwood
Robert J. Hatstat
BY
Norman L. Blodgett
Attorney

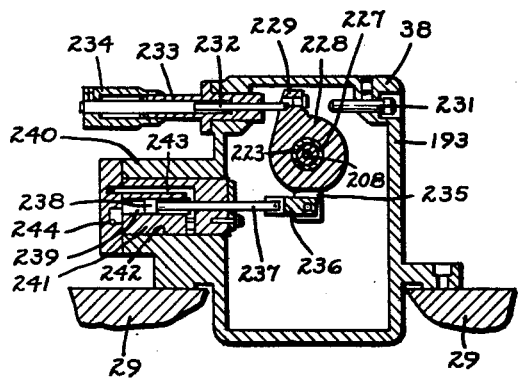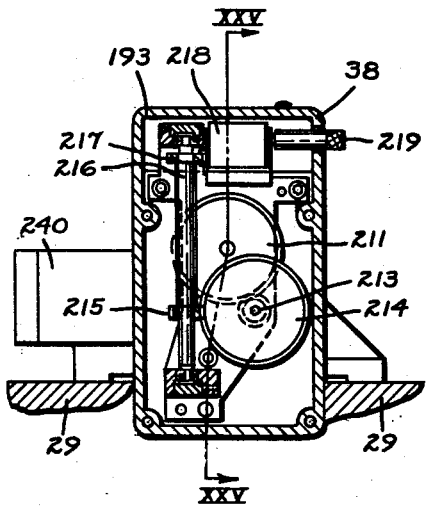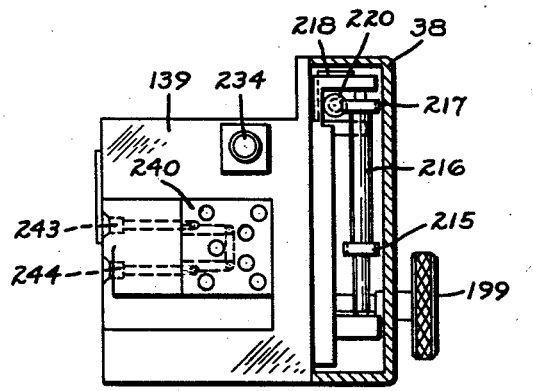

May 5, 1964    A. F. TOWNSEND ETAL    3,131,517
GRINDING MACHINE

Filed Dec. 13, 1961    23 Sheets-Sheet 10

INVENTORS
Almon F. Townsend
George H. Lockwood
Robert J. Hatstat
BY
Norman L. Blodgett
Attorney

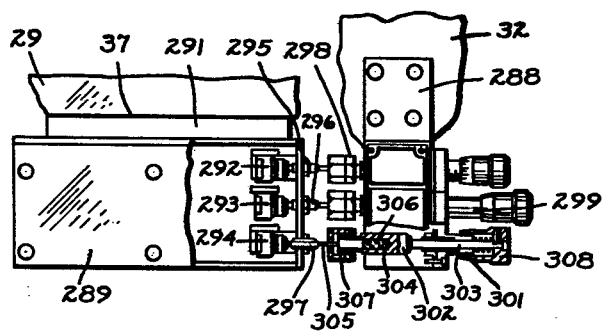
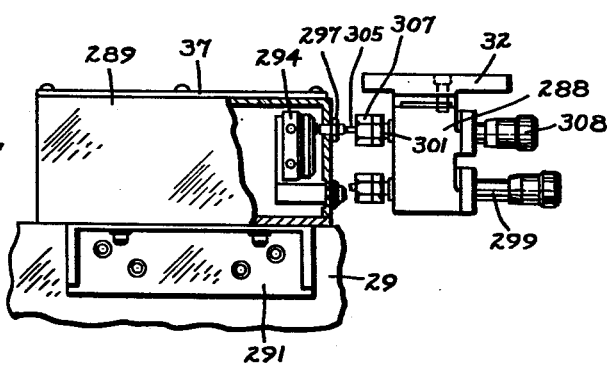
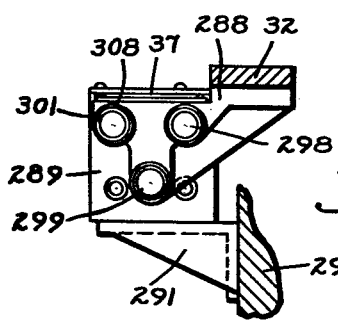

May 5, 1964   A. F. TOWNSEND ETAL   3,131,517
GRINDING MACHINE

Filed Dec. 13, 1961   23 Sheets-Sheet 13

INVENTORS
Almon F. Townsend
George H. Lockwood
Robert J. Hatstat
BY Norman S. Blodgett
Attorney May 5, 1964    A. F. TOWNSEND ETAL    3,131,517
GRINDING MACHINE Filed Dec. 13, 1961    23 Sheets-Sheet 14

INVENTORS
Almon F. Townsend
George H. Lockwood
Robert J. Hatstat
BY Norman S. Blodgett
Attorney INVENTORS
Almon F. Townsend
George H. Lockwood
Robert J. Hatstat
BY Norman S. Blodgett
Attorney

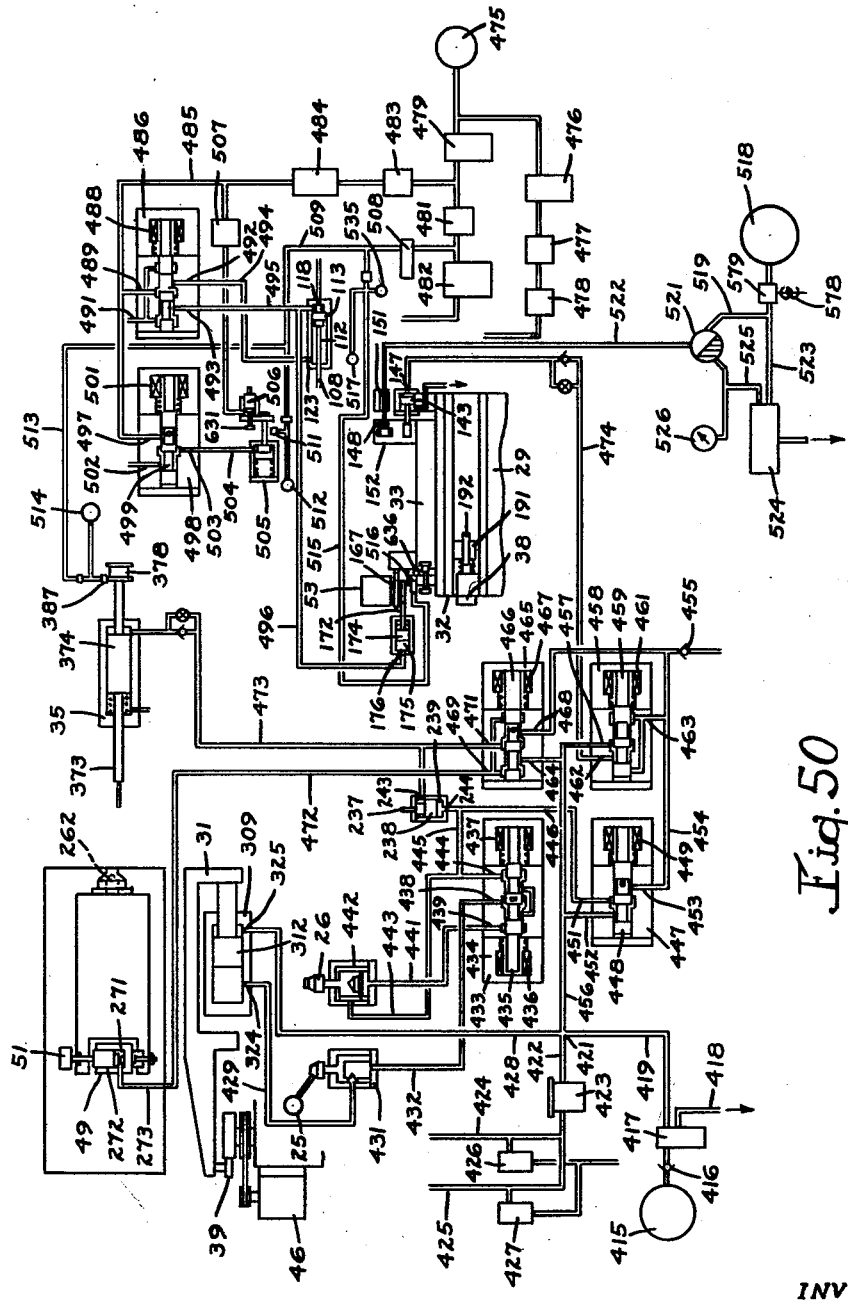

INVENTORS
Almon F. Townsend
George H. Lockwood
BY Robert G. Hatstat
Norman S. Blodgett
Attorney INVENTORS
Almon F. Townsend
George H. Lockwood
Robert J. Hatstat

United States Patent Office 3,131,517
Patented May 5, 1964

3,131,517
GRINDING MACHINE
Almon F. Townsend and George H. Lockwood, Worcester, and Robert G. Hatstat, Rutland, Mass., assignors to The Heald Machine Company, Worcester, Mass., a corporation of Delaware
Filed Dec. 13, 1961, Ser. No. 158,974
36 Claims. (Cl. 51—165)

This invention relates to a grinding machine and more particularly to apparatus for abrading bores in very small workpieces, the expression "abrading" being intended to cover the processes of grinding and/or burring.

The art of grinding bores in small workpieces, for example, in the abrasive finishing of the internal diameter of a race of a miniature ball bearing, has encountered many problems. The fact that the workpiece is small and the bore is also small would lead one to believe that the abrasive operation could be carried on very quickly. However, in the past it has been discovered that the fact that the workpiece is small does not shorten the handling time or the time required to remove a finished workpiece and insert one which is to be finished. In the grinding of miniature bearing races, also, the problem of variations in the outside diameter of the workpiece and its effect on the ability to maintain the internal diameter to a close tolerance still exists, perhaps, in an even greater degree than in the case of larger workpieces. Handling of small workpieces is difficult because of the necessarily delicate nature of the apparatus which must be used. Furthermore, because of the small size of the spindle on which the internal grinding wheel is mounted, the possibility of obtaining a tapered bore, when a straight, cylindrical bore is desired, is a very serious problem. Internal grinding machines built in the past have used either the "feed rate" method of feeding the abrasive wheel into the surface to be finished, or the "control force" method, but no such machine has been capable of being converted from one method to the other without extensive modification of the machine. In addition, the feed control systems in both cases have been complicated, expensive, and often in need of repair. The methods for reciprocating the rotating abrasive wheel within the bore of the workpiece have, in the past, been quite complicated and it has been difficult to control the length of the reciprocating stroke. These and other difficulties experienced with the prior art devices have been obviated in a novel manner by the present invention.

It is, therefore, an outstanding object of the invention to provide a grinding machine for quickly and efficiently furnishing bores in small workpieces by abrasion.

Another object of this invention is the provision of an internal grinding machine having a novel method of supporting a workpiece and obtaining automatic O.D. compensation.

A further object of the present invention is the provision of an internal grinding machine for finishing the surfaces of small bores, provision being made to prevent the development of bellmouth or taper due to the deflection of a thin spindle on which the abrasive wheel is mounted.

It is another object of the instant invention to provide an internal grinding machine in which the feeding method may be quickly changed from the "feed rate" method to the "controlled force" method.

It is a further object of the invention to provide an internal grinding machine incorporating a reciprocating means for the abrasive wheel, which means is simple and inexpensive.

A still further object of this invention is the provision of an internal grinding machine specifically adapted for use in grinding very small workpieces, such as miniature bearing races, which machine is capable of finishing the internal bores of such workpieces quickly, efficiently, and with a minimum of time in which the machine is not actively abrading the surface to be finished.

It is a still further object of the present invention to provide an internal grinding machine having a simple but effective feed-rate mechanism.

Another object of the invention is the provision of means for performing a controlled-force grinding operation while compensating for spindle deflection.

Another object of the invention is the provision of a grinding machine having a centerless workholding fixture which permits rapid loading and unloading of workpieces and which gives automatic O.D. compensation.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which:

FIG. 14 is a vertical sectional view of the apparatus taken on the line XIV—XIV of FIG. 12;

FIG. 15 is a schematic view of the working area of the workhead unit shown in FIG. 7;

FIG. 16 is an elevational view of the apparatus taken on the line XVI—XVI of FIG. 12;

FIG. 26 is a vertical sectional view of the compensating mechanism taken on the line XXVI—XXVI of FIG. 24;

FIG. 27 is a vertical sectional view of the compensating mechanism taken on the line XXVII—XXVII of FIG. 24;

FIG. 28 is a vertical sectional view of the compensating mechanism taken on the line XXVIII—XXVIII of FIG. 24;

FIG. 34 is a plan view of a cross-slide switch unit forming part of the invention;

FIG. 35 is a side elevational view of the cross-slide switch unit;

FIG. 36 is a front elevational view of the switch unit shown in FIG. 34;

FIG. 50 is a schematic diagram of the hydraulic circuitry forming a part of the present invention;

For the purposes of the present description, the expression "front" shall be used to indicate that side of the grinding machine which normally faces toward the operator and which normally carries the controls and the like; in a similar manner, the expression "side" shall be used to indicate a direction at a right angle to the front of the machine, while the expression "rear" shall indicate surfaces and directions facing away from the front of the machine.

Figure 1:
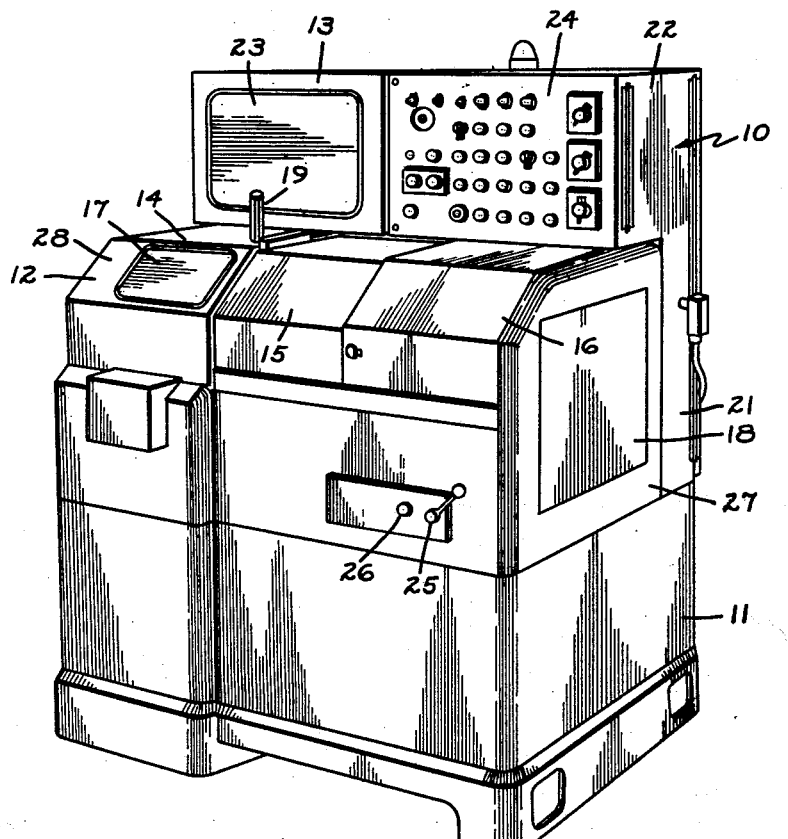
FIG. 1 is a perspective view of the grinding machine embodying the principles of the present invention, the machine being shown with protective covers in place.

Referring first to FIG. 1, wherein are shown the general features of the invention, the grinding machine, indicated by the reference numeral 10, is shown as consisting of a base 11 on which is mounted a machine portion 12 and a control cabinet 13. The base 11 is open to the rear and encloses a pressure oil supply (not shown), but which consists in the usual way of a motor, pump, sump, and the necessary connections. The machine portion 12 is provided with removable covers 14, 15, and 16 which are also slidable sideways for access to the operating elements. The cover 14 is provided with a transparent window 17 permitting observation of the operation taking place. The machine portion is provided at one end with a removable access door 18. Extending upwardly through the cover 14 is a feed chute 19 whereby workpieces may be introduced into the machine without the necessity of removing the covers. The control cabinet 13 is of a generally inverted L-shaped cross-sectional form; it has a narrow lower portion 21 which lies behind the machine portion 12 and a wide upper portion 22 which extends forwardly and overlies part of the machine portion. The left side of the upper portion 22 contains an air cleaning and regulating system 23, while the right side of the upper portion contains the electrical control panel 24. Extending from the front of the machine portion 12 is a throttle handle 25 and a dress speed knob 26.

Figure 2:
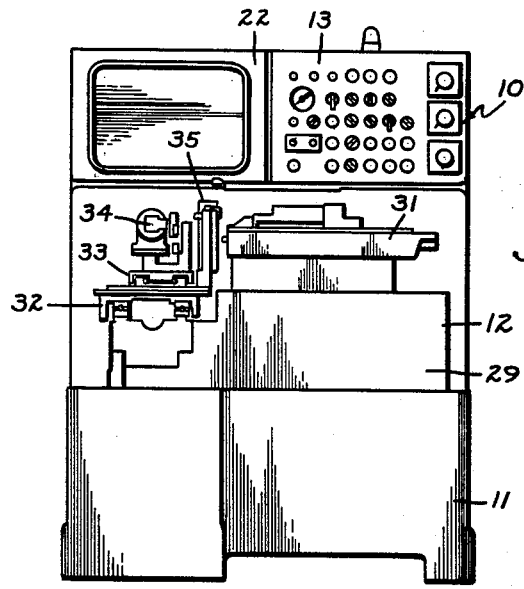
FIG. 2 is a front elevational view of the invention with certain of the covers removed.
Figure 3:
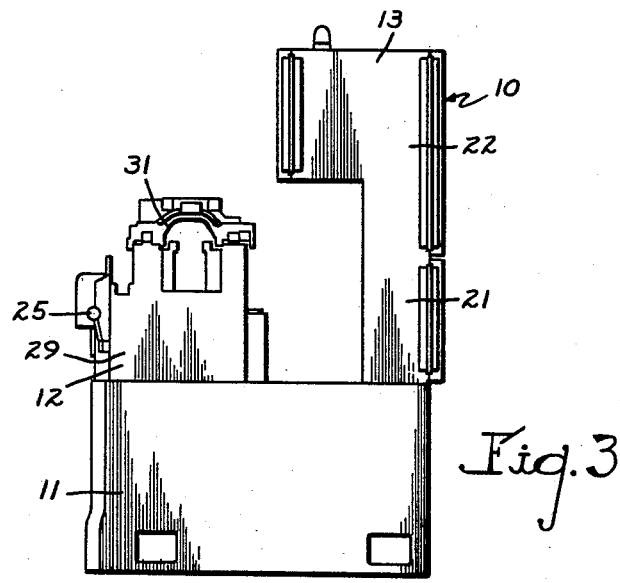
FIG. 3 is an end side elevational view as observed from the right in FIG. 2.

FIGS. 2 and 3 show the grinding machine 10 with the covers 14, 15, and 16, the end plate 27 which contains the axis door 18 and an end panel 28 at the other end of the machine removed. It can be seen that the machine portion 12 consists of a base 29, on one side of which is mounted a wheelhead portion 31 and a secondary base 32 which is slidable forwardly or rearwardly over the base 29 on suitable anti-friction bearings. Mounted on the secondary base for forward or rearward movement on suitable anti-friction sliding means is a table 33 on which is mounted a workhead unit 34. It should be noted that the wheelhead portion 31 is mounted on the base 29 for sliding from side to side of the machine. Also mounted on the base is a dressing mechanism 35. Certain elements of the machine portion have been removed from the front of the secondary base 32, the table 33, and the workhead 34 in order to clarify the relationship between these elements.

Figure 4:
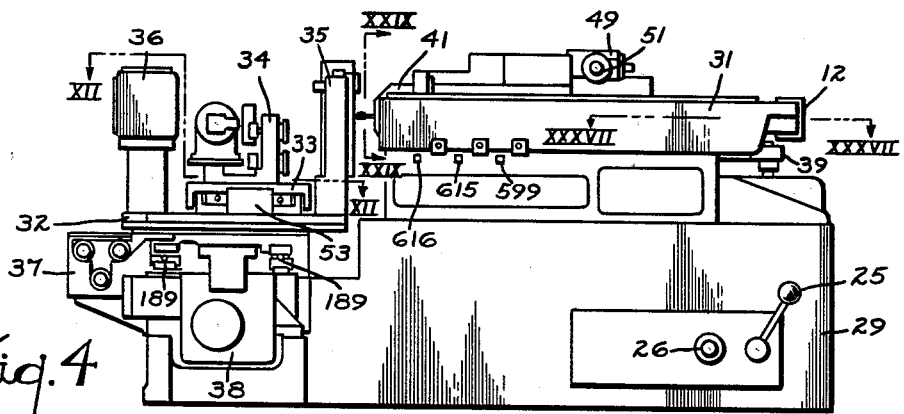
FIG. 4 is a front elevational view of the major mechanical portion of the machine.
Figure 5:
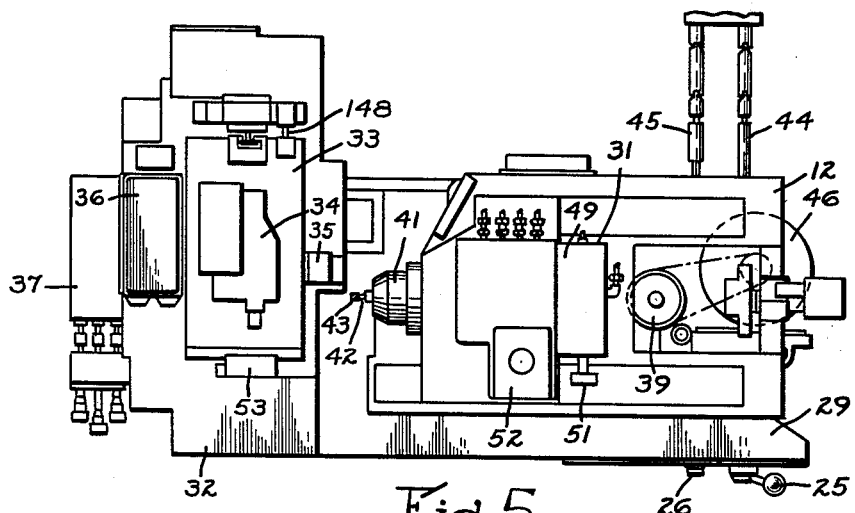
FIG. 5 is a plan view of the apparatus shown in FIG. 4.
Figure 6:
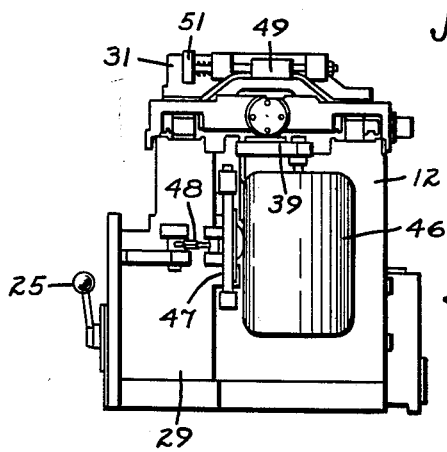
FIG. 6 is an end elevational view of the apparatus shown in FIG. 4 taken from the right in that view.
Figure 7:
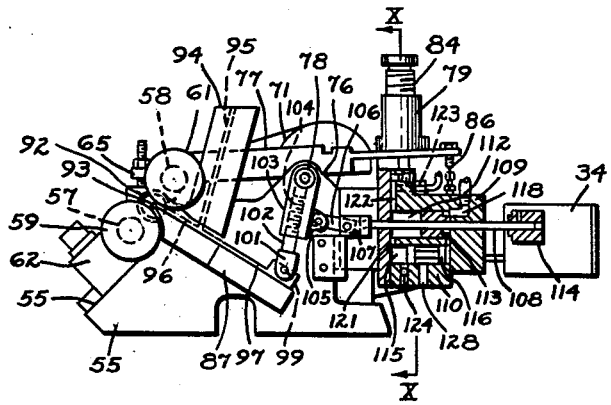
FIG. 7 is a side elevational view of a workpiece loading and holding mechanism or workhead unit as veiwed from the right in FIG. 4.
Figure 8:
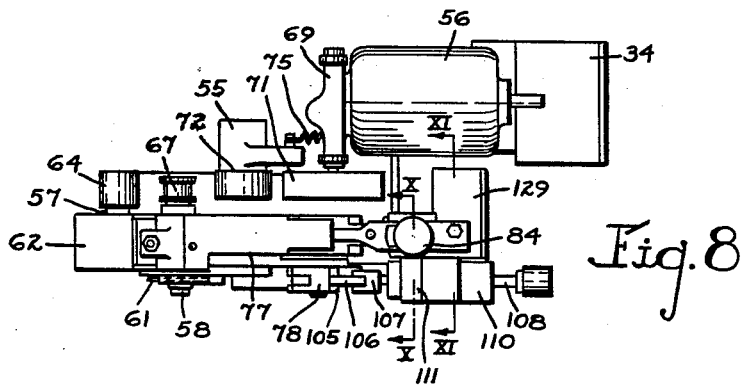
FIG. 8 is a plan view of the mechanism shown in FIG. 7.

FIGS. 4, 5, and 6 show in greater detail the machine portion 12 with the workhead 34 and the dressing mechanism 35 in place. Mounted on the secondary base 32 beside the table 33 is a pressure switch container 36. Mounted on the left side of the base 29 is a cross-slide switch unit 37. Mounted on the front surface of the base 29 underlying the secondary base 32 is a compensating mechanism 38. Located to the right of the machine portion and operating to reciprocate the wheelhead portion 31 relative to the base 29 is an oscillating mechanism 39. Mounted in the wheelhead portion 31 is a wheelhead 41 in which is mounted a spindle 42 carrying a small abrasive wheel 43. The wheelhead is of the air-actuated turbine-driven type and rotates at speeds well over 100,000 r.p.m. In FIG. 5 it can be seen that the throttle handle 25 operates through a shaft 44 extending from the rear of the machine portion into the control cabinet, while the dial 26 operates a valve in a similar manner by means of a shaft 45. FIG. 6 shows particularly well the manner in which an electric motor 46 is mounted to drive the oscillating mechanism 39. The motor is mounted on a platform 47, the inner edge of which is attached by hinges to the base 29 for swinging motion about a vertical axis. The outer edge is connected by an adjusting link 48 to another part of the base through a link 48 having a turnbuckle sleeve. The length of the link 48 can be adjusted so that the motor on its platform can be swung about the hinge connection of the platform to the base to change the tension in a belt drive connecting it to the oscillating mechanism 39. Mounted on top of the wheelhead portion 31 is a wheelhead swinging mechanism 49 having an adjusting knob 51. Also mounted on the top of the wheelhead portion 31 is a wheelhead swing indicating mechanism 52. Mounted on the front of the secondary base 32 is a feed rate feed mechanism 53.

The Workhead

Figure 9:
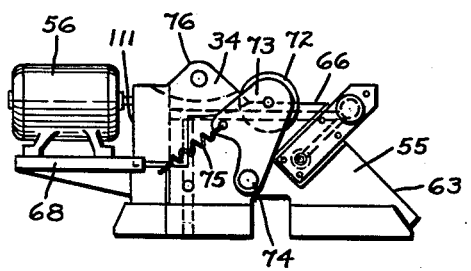
FIG. 9 is an elevational view of the mechanism taken from the side opposite that shown in FIG.7 with many elements removed to show the basic supporting structure.
Figure 10:
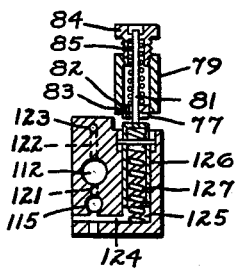
FIG. 10 is a vertical sectional view of the invention taken on the line X—X of FIG. 8.

FIGS. 7, 8, 9, 10, 11, and 15 show the details of the workhead 34. It is shown as consisting of a main body 55 on the rear of which is mounted an electric motor 56 connected by flexible belting to drive a shaft 57 and a shaft 58 on which are mounted drive wheels 59 and 61, respectively. The shaft 57 is mounted in a block 62 and bolted to an inclined surface 63 at one end of the body 55. The shaft 57 extends from both sides of the body 55, one end carrying the drive wheel 59 and the other end being provided with a pulley 64. The shaft 58 is mounted in a block 65; on the end of the shaft 58 which extends from the side of the body opposite the wheel 61 is mounted a pulley 67. Mounted on a shelf 68 on the side of the body 55 opposite the wheels 59 and 61 is the electric motor 56; one of its output shafts is connected through a gear reduction unit 69 to a large pulley 71. As is best shown in FIG. 9, an idler pulley 72 is rotatably mounted on one end of a lever 73, the other end of which is swingably mounted on a pivot pin 74 extending from the side of the body 55 opposite the drive wheels. A suitable spring 75 maintains the idler wheel bias in the proper direction. A flexible belt (not shown) extends around the pulley 71, the idler pulley 72, the pulley 67, and the pulley 64, the spring 75 maintaining the proper tension in the belt through the idler wheel 72. Extending upwardly from the body 55 are a pair of ears 76 to which are pivotally mounted an arm 77. At one end the arm 77 carries the block 65 in which the shaft 58 is rotatably carried along with the drive wheel 61 and the pulley 67. A hinge pin 72 extends through the pair of ears 76 and the arm is carried on that pin. At the opposite end the arm 77 is provided with a vertically-extending sleeve 79 carrying a contact pin 81 which extends through an aperture in the arm 77 and extends downwardly therefrom. The pin is threaded and on this threaded portion is mounted a nut 82 which lies within the sleeve and which is capable of being locked against rotation relative to the arm 77 by means of a pin 83 extending upwardly from the arm 77 into a vertical aperture in the nut 82. At the top of the sleeve it is threadedly engaged by an adjusting member 84 which is counterbored on its underside to receive the upper end of a strong coil spring 85, the lower end of which engages the upper surface of the nut 82. The pin 81 extends vertically upwardly through the spring 85 and slidably engages the adjusting member 84, as is best shown in FIG. 10. At its extreme outer end the arm 77 is provided with an adjustable contact member 86 whose vertical position may be changed by means of threads and lock nuts.

Figure 11:
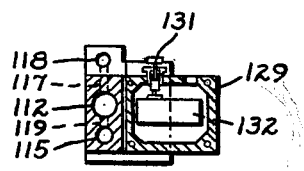
FIG. 11 is a vertical sectional view of the mechanism taken on the line XI—XI of FIG. 8.
Figure 12:
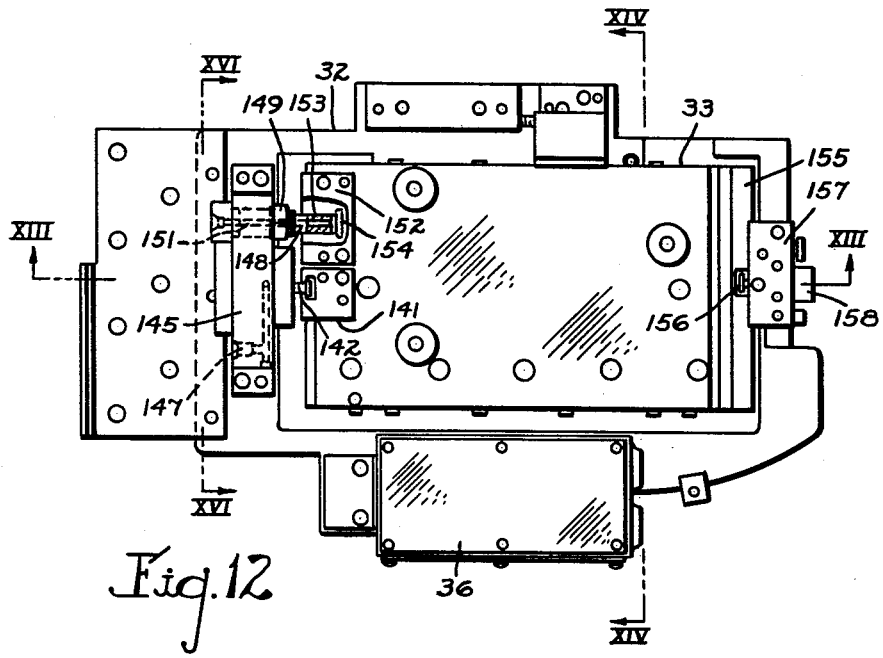
FIG. 12 is a horizontal sectional view of the apparatus taken on the line XII—XII of FIG. 4.
Figure 13:
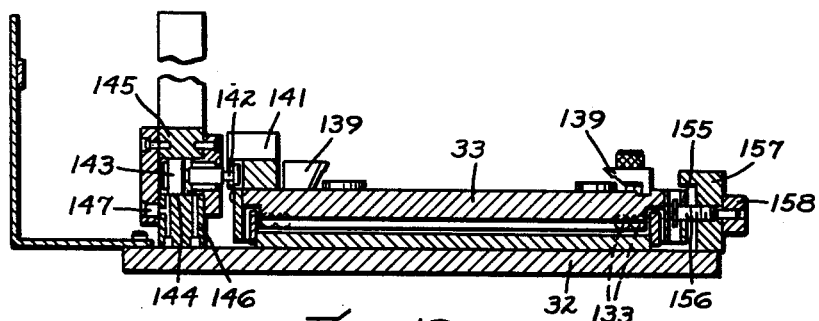
FIG. 13 is a vertical sectional view of the apparatus taken on the line XIII—XIII of FIG. 12.
Figure 17:
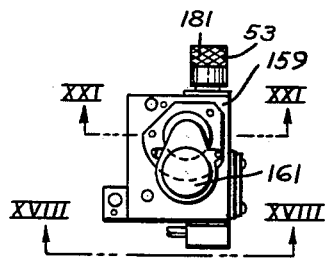
FIG. 17 is a plan view of a feed mechanism forming part of the apparatus.
Figure 18:
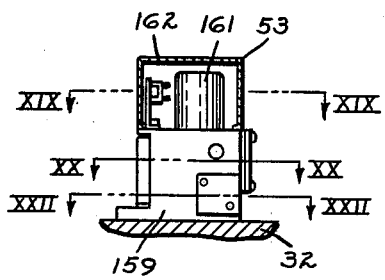
FIG. 18 is an elevational view of the feed mechanism as observed along the line XVIII—XVIII of FIG. 17.
Figure 19:
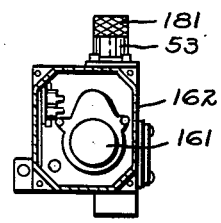
FIG. 19 is a horizontal sectional view of the feed mechanism taken on the line XIX—XIX of FIG. 18.
Figure 20:
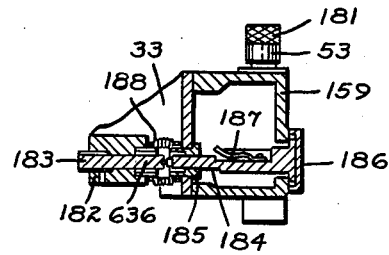
FIG. 20 is a horizontal sectional view of the apparatus taken on the line XX—XX of FIG. 18.
Figure 21:
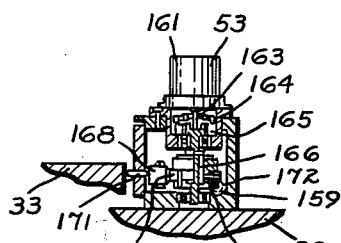
FIG. 21 is a vertical sectional view of the apparatus taken on the line XXI—XXI of FIG. 17.
Figure 22:
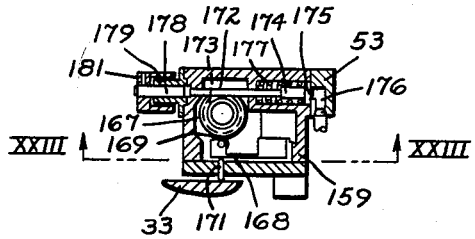
FIG. 22 is a horizontal sectional view of the mechanism taken on the line XXII—XXII of FIG. 18.
Figure 23:
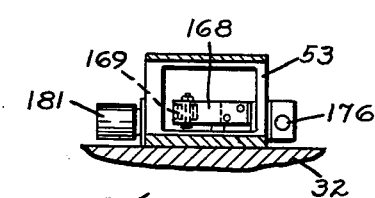
FIG. 23 is a vertical sectional view of the invention taken on the line XXIII—XXIII of FIG. 22.
Figure 24:
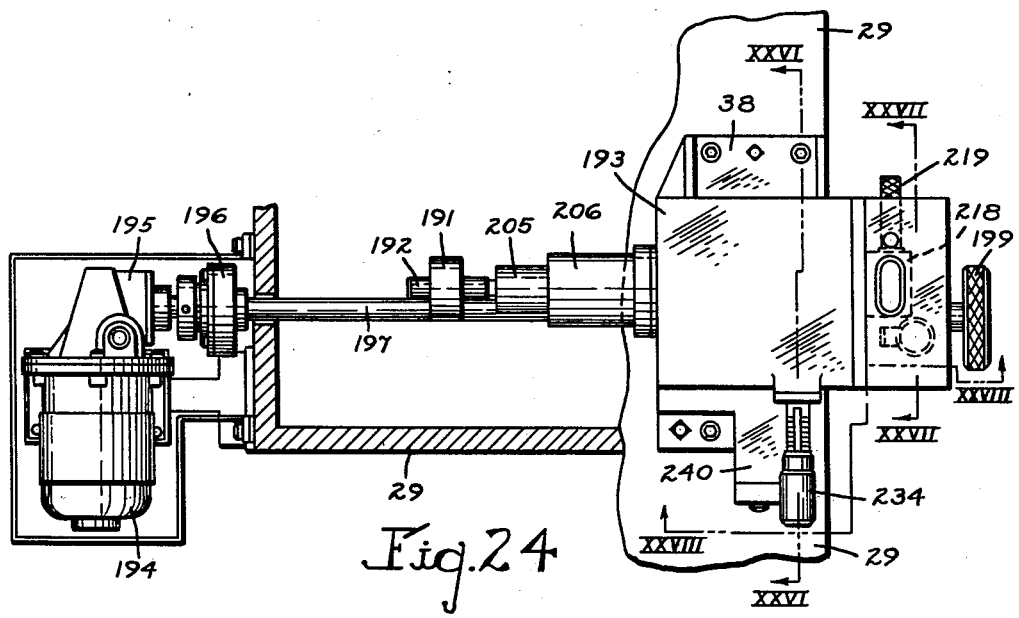
FIG. 24 is a plan view of a compensating mechanism forming a portion of the invention.
Figure 25:
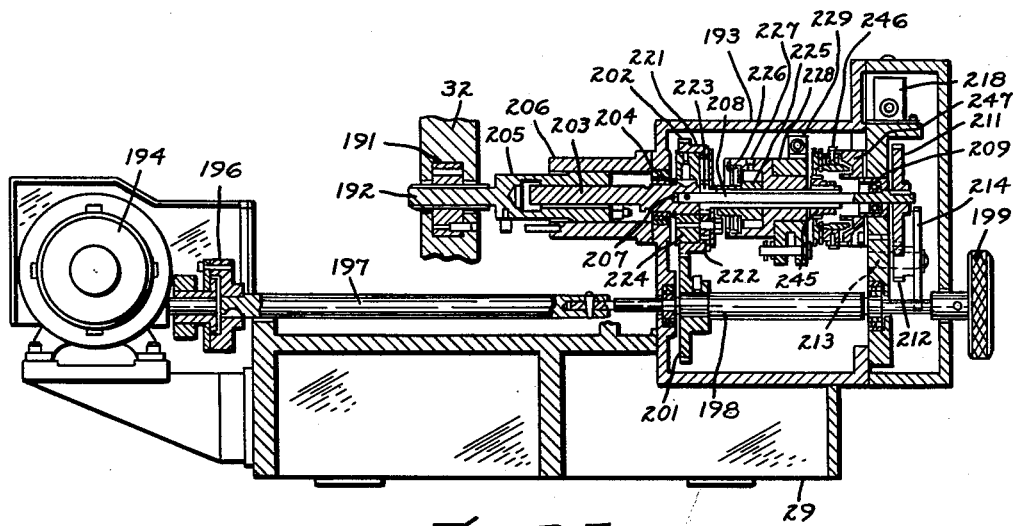
FIG. 25 is a vertical sectional view of the compensating mechanism taken on the line XXV—XXV of FIG. 27.
Figure 29:
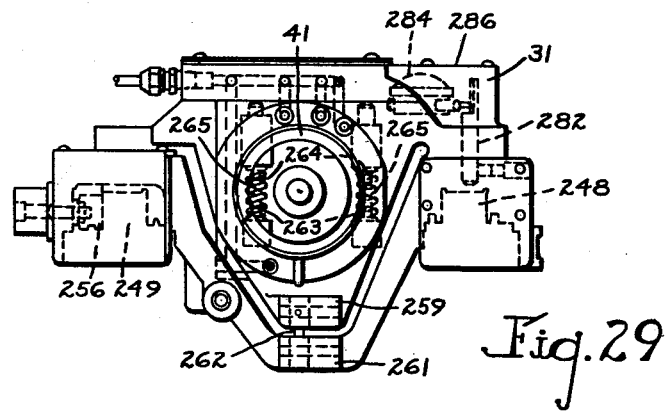
FIG. 29 is a side elevational view of a wheelhead portion of the apparatus as observed along the line XXIX—XXIX of FIG. 4.
Figure 30:
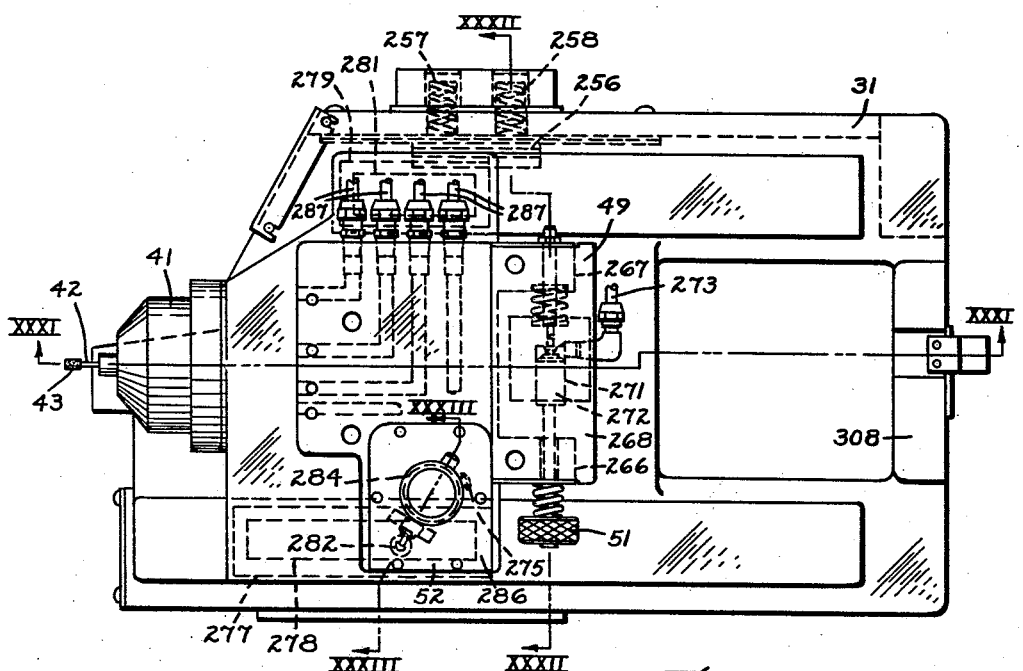
FIG. 30 is a plan view of the apparatus shown in FIG. 29.

Fastened to the side of the body 55 and in the same plane as the wheels 61 and 59 is a shoe 87. As is evident in FIG. 15, the shoe 87 is provided with a flat edge 88 which extends at approximately an angle of 45° to the horizontal. Intersecting this edge 88 at right angles is a contact edge 89 which engages the periphery of the workpiece 91 which is shown as consisting of the outer race of a ball bearing. Underlying the shoe 87 is a pressure plate 92. This plate is provided with a hardened metal insert 93 which is adopted to back up the workpiece 91 at its inboard end. It should be noted that the insert 93 is provided with a central aperture for the admission of the abrasive wheel. Also mounted on the side of the body 55 is a feed chute 94 having a groove 95 which underlies the chute 19 and which may be loaded with small workpieces. The feed chute is provided with an angular lower edge 96 which is spaced from and parallel to the upper edge 88 of the shoe 87. The space between the lower edge 96 and the edge 88 of the shoe carries a slidable feed finger 97, at the lower end of which is provided an upwardly-extending abutment having a slot entering the upper edge. In the slot is slidably engaged a pin 99 extending through a clevis 101 having an upwardly-extending arm 102. The arm 102 extends into a bore in a link 103 which is pivoted on the outer end of the pin 78, this being the pin on which the arm 78 is also pivoted. A spring 104 lies inside the bore in the link 103 and is compressed between the pin 78 and the end of the arm 102. The link 103 is provided with an intermediate ear 105 which is pivotally attached to a link 106 which, in turn, is attached to a clevis 107 at the outer end of a piston rod 108. The piston rod extends entirely through a valve 109 having a body 110 mounted on a vertical surface 111 of the body 55. The valve body 110 is provided with a bore 112 in which is slidably mounted a piston 113 fixed to the piston rod 108. The piston rod 108 extends well out of the body 110 and is provided at its outer end with a stop 114 which is adjustable along the piston rod by means of a set screw. Underlying and parallel to the bore 112 is a bore 115 of somewhat smaller size containing a reciprocable spool 116. At its rearward end the bore 115 is connected by a passage 117 to a passage 118 leading to a source of air pressure (not shown). At the same end of the bore 112 it is also connected to the bore 115 by a short passage 119, all of this being best evident in FIG. 11. In a similar manner, the bores 112 and 115 are connected together at the forward end by a passage 121; also, the bore 112 is connected by a small passage 122 at its upper side to a passage 123 leading to a source of air pressure (not shown), as is evident in FIG. 10. At its lower portion the bore 115 is connected at its forward end to a passage 124 leading to the bottom of a vertical bore 125. Slidable in the vertical bore is a sleeve 126 having contained therein a coil spring 127 which is weak compared to the spring 85 overlying it in the arm 77. The sleeve 126 is suitably guided and keyed by means of a pin extending transversely therethrough into vertical slots in the sides of the bore 125. Extending outwardly of the body 110 from the bore 115 in its central portion is an exhaust passage 128 (see FIG. 7). Fastened to the back of the body 110 is an electrical box 129 which is best shown in FIG. 11. The box is provided with a spring-loaded plunger 131 which contacts the actuating member of a micro-switch 132 contained within the box.

The construction of the table 33, the manner of its mounting on the secondary base 32, and the manner in which it is moved along with the workhead mounted on top of it is shown in FIGS. 12, 13, 14, and 16. To begin with, the table is mounted for forward and backward movement over the base 32 by means of linearly-arranged ball bearings 133. Opposed guide rails 134 and 135, which are best seen in FIG. 14, are mounted at opposite sides of a small plate 136 carried by and bolted to the top of the secondary base 134. Facing these guide rails are guide rails 137 and 138 mounted on the underside of the table 33 and lying parallel and close to the rails 134 and 135, respectively. The opposed faces of the rails 134 and 137 are formed with grooves consisting of plain surfaces which are inclined at angles of 45° to horizontal. The four surfaces thus formed serving to define a diamond-shaped space in which the ball bearings 133 are imprisoned. Similar angled recesses are formed on the opposed surfaces of the rails 135 and 138. These bearings contain means for adjustment and provide for smooth rectilinear gliding action of the table from front to back of the secondary base 32. Also extending upwardly from the secondary base 32 is a pressure switch container 36 which is used in connection with an air gauging mechanism in the workhead to continuously gauge the size of the workpiece during the grinding operation. Mounted on the upper surface of the table 33 are clamping members 139 by which means the workhead 34 is fastened to the top of the table. At its rearward end the table 33 is provided with an abutment 141 which is engaged by a headed piston rod 142 connected to a piston 143 which is slidable in a bore 144 formed in an abutment 145 extending upwardly from the rear portion of the secondary base 32. The forward end of the bore 144 is connected by a passage 146 to a controlled source of pressure oil (not shown) while the rearward end of the same bore is connected by a passage 147 to the same source of pressure oil. The same abutment 145 is also provided with a stud 148 which is locked in place by a nut 149 and which is provided with a central bore 151 connected to a source of regulated low-pressure coolant oil (not shown). Mounted on the top of the table beside the abutment 141 is a block 152 which is provided with a horizontal bore 153 in which the stud 148 is slidable. The inner end of the bore 153 is provided with an enlarging pocket 154.

The front side of the table 33 is provided with a slotted attachment 155 engaged by the enlarged head of a stop member 156 which is threadedly engaged with an abutment 157 fastened to the forward end of the secondary base 32. The stop member 156 extends through the abutment 157 and has keyed thereto a knob 158 permitting adjustment of the operative head of the stop member.

Feed Rate Mechanism

The feed rate mechanism 53 is shown in FIGS. 17 through 23. This apparatus consists of a box 159 mounted on the secondary base 32. Mounted on top of the box is an electric motor 161 enclosed in a dust cover 162, which cover appears in some of the figures but is removed in others. The motor is provided with a 3600:1 gear reduction unit having an output shaft 163 which is connected through a torque slip clutch 164 and a one-way slip clutch 165 of the Formsprag type to a shaft 166 extending vertically through the box 159 and keyed to a cam 167. This cam is formed according to a predetermined pattern to control the transverse feeding of the workpiece relative to the wheel during the grinding operation. Its shape, therefore, will be determined by the particular type of operation which is to be carried out. Adjacent the cam is one end of a cam follower 168 having a roller 169 at its free end which engages the cam 167. The other end of the cam follower is fastened to the box. Slidably extending through the wall of the box is a pin 171 which presses against the cam follower 168 at the side thereof opposite the roller 169 and opposite the cam. This pin is engaged by the front wall of the table 33. Extending horizontally through the lower part of the box is a rack 172 which engages a spur-gear 173 keyed to the shaft 166 below the cam 167. The rack 172 constitutes a piston rod associated with a piston 174 which is slidable in a horizontal bore 175 extending through the box. At one end the bore is exposed to a passage 176 which is connected to a source of pressure air (not shown). A coil spring 177 lies within bore 175 and presses against the piston 174 and the opposite end of the bore to maintain the rack to the right in FIG. 22. Also mounted in the box 159 and engaging the end of the rack 172 is a stop pin 178 which is threaded through a hub 179 fastened to the side of the box. The outer end of the hub is provided with a knob 181 for its adjustment because of a threaded engagement with the hub. Fastened to the table 33 is an abutment 182 having a threaded bore therethrough in which resides a threaded stop member 183. This stop member is provided with a contact area at one end (the end facing the feed mechanism 53) and on occasion engages an electrical contact shaft 184 which extends through the box from one side to another, as is evident in FIG. 20. At the left hand side of the box an insulated bushing 185 prevents electrical engagement between the shaft 184 and the side of the box. At the other end the shaft 184 is supported in an access closure 186 which is insulated from the body of the box in a suitable manner. An electrical lead 187 extends away from the shaft. A neoprene bellows 188 covers the contact points of the stop member 183 and the contact shaft 184 to prevent dirt and similar matter from fouling the electrical contact surfaces.

Compensating Mechanism

As has been described in connection with FIG. 4, the secondary base 32 is separated from and mounted on the main base 29 for sliding motion from front to rear on ball bearings 189. As is evident in that view, the secondary base 32 and the main base 29 are joined by and this motion is controlled by means of the compensating mechanism 38. This mechanism is shown in detail in FIGS. 24 through 28. Fastened to the underside of the secondary base 32 in the central portion thereof is a nut 191. This nut is threadedly engaged with a threaded shaft 192 and the rotation of this shaft causes forward and backward movement of the secondary base 32 carrying with it the table 33 and the workhead 34. The compensating mechanism consists of a housing 193 bolted to the front of the base 29 and a motor 194 bolted to the rear of the base. The motor is provided with a gear reduction unit 195 which is connected through a clutch 196 to a shaft 197. This shaft extends forwardly and is connected to a similar horizontal shaft 198 extending entirely through the housing 193 and being suitably mounted in bearings. The shaft extends forwardly of the housing 193 and is provided with a manual adjusting knob 199. Within the housing 193 it carries a spur gear 201. This spur gear engages a planetary gear system 202 carried in the upper part of the housing 193. Extending from the center of the system is a shaft 203 carried in a ball bearing 204 in the wall of the housing. Slidably keyed to this shaft where it extends rearwardly of the housing is a sleeve 205 forming an extension of the threaded shaft 192. The outside of the sleeve 205 is threadedly engaged with a sleeve 206 which is bolted to the rearward surface of the housing 193. It can be seen, then, that a differential action takes place because of the threaded engagement of the sleeve 205 with the interior of the sleeve 206 and the threaded engagement of the shaft 192 with the nut 191, the leads being slightly different. The end of the shaft 203 which extends into the housing 193 is provided with a counterbore 207 in which is fastened one end of a considerably thinner shaft 208, the forward end of which resides in a ball bearing 209 mounted in a forward wall of the housing. The shaft 208 extends forwardly of the bearing 209 and on its extended outer end is mounted a spur gear 211. This gear engages a small spur gear 212 which is mounted on a stub shaft 213 at the outer end of which is mounted a large diameter worm 214. This worm engages a worm gear 215 mounted on a vertical shaft 216. At the top of the shaft 216 it is provided with a worm 217 which engages a worm gear 220 on an actuating shaft of a counter 218. At the other side a pin 219 extends through the housing 193 and engages the reset portion of the counter 218.

The planetary gear system 202 consists of an outer ring gear 221 having external teeth which engage the spur gear 201 and internal teeth which engage a planetary gear 222. The planetary gear also engages a small sun gear 223 which is rotatably mounted on the shaft 208 and which is provided with a long tubular hub which extends along the shaft. Slidably mounted within the outer ring gear 202 is a disk-like block 224 and on this block is rotatably mounted the planetary gear 222. The block is keyed to the inner end of the shaft 203. The sun gear 223 is keyed to the inner portion 225 of a one-way clutch 226 of the "Formsprag" type; the outer portion 227 of the clutch is provided with a yoke 228, best shown in FIG. 26. The yoke is provided with an upstanding ear 229 which engages a stop 231 at one side and a threaded stop 232 at the other side. The stop 232 is threadedly engaged with a bushing 233 mounted in the housing 193 and the stop is provided with a long spindle at the outer end of which is mounted an adjusting knob 234. The yoke 228 is provided at its lower end with a clevis 235 which embraces and is pivotally attached to one end of a short link 236. The other end of the link is pivotally attached to the outer end of a piston rod 237 which is attached to a piston 238 which is slidable in a bore 239 in a cylinder 241. The cylinder is mounted in a bore 242 extending horizontally through a boss 240 on the housing 193. A passage 243 connects the inner end of the bore 239 to a source of pressure oil, while a passage 244 connects the outer end of the bore 239 to the source of pressure oil.

Also connected to the tubular boss of the sun gear 223 is the internal member 245 of an electric clutch 246 whose external member 247 is bolted to the housing and is fixed thereto. The electric clutch 247 is connected for energization at will and electrical leads are provided for that purpose.

Figure 31:
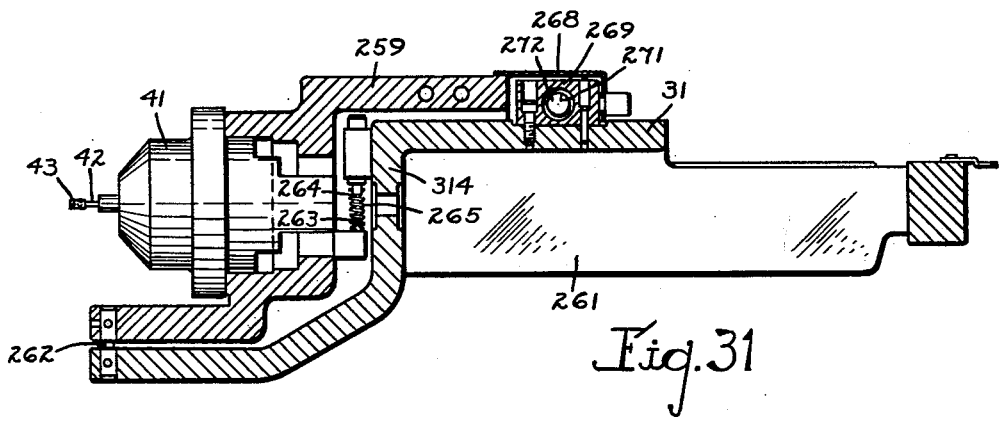
FIG. 31 is a vertical sectional view of the wheelhead portion taken on the line XXXI—XXXI of FIG. 30.
Figure 32:
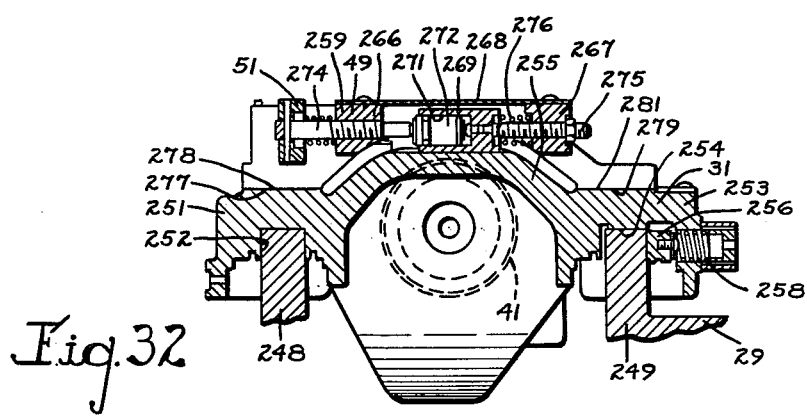
FIG. 32 is a vertical sectional view of the wheelhead portion taken on the line XXXII—XXXII of FIG. 30.
Figure 33:
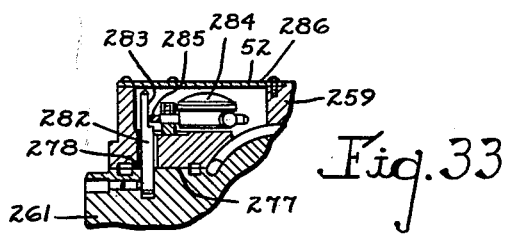
FIG. 33 is a vertical sectional view of a part of the wheelhead portion taken along the line XXXIII—XXXIII of FIG. 30.
Figure 37:
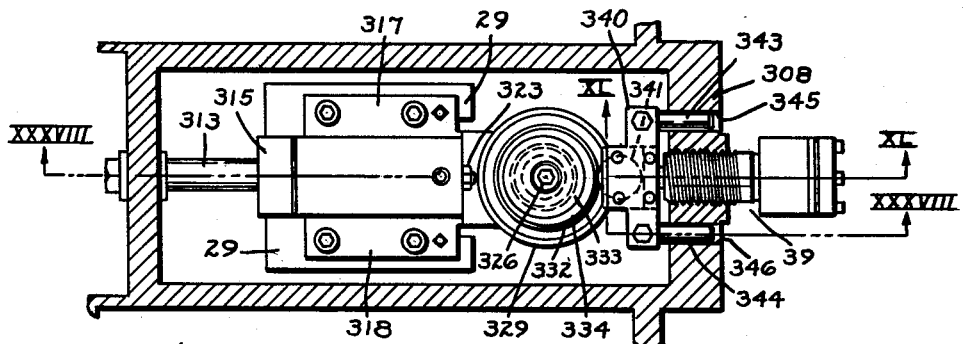
FIG. 37 is a sectional view of the wheelhead portion of the apparatus particularly showing an oscillator mechanism taken along the line XXXVII—XXXVII of FIG. 4.
Figure 38:
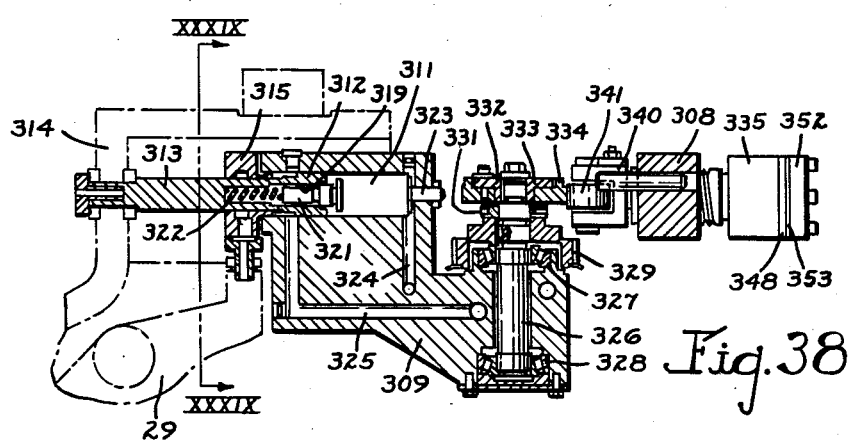
FIG. 38 is a vertical sectional view of the oscillator mechanism taken on the line XXXVIII—XXXVIII of FIG. 37.
Figures 39, 40:
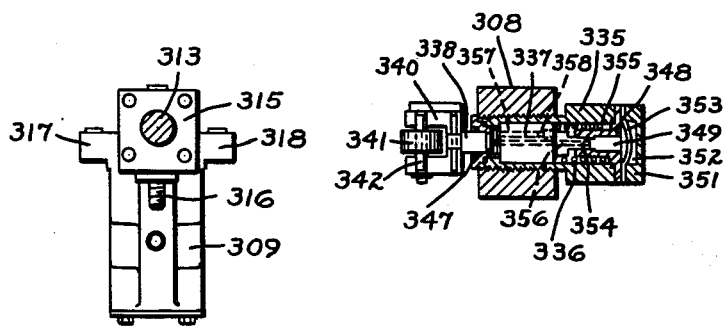
FIG. 39 is a sectional view of the apparatus taken on the line XXXIX—XXXIX of FIG. 38.
FIG. 40 is a vertical sectional view of the oscillator mechanism taken on the line XL—XL of FIG. 37.
Figure 41:
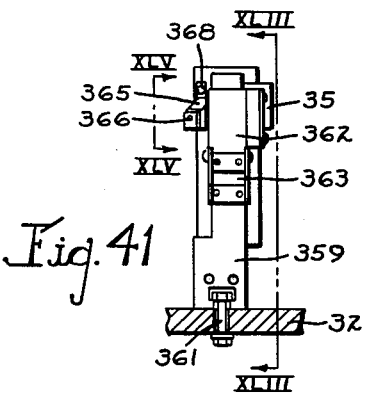
FIG. 41 is a front elevational view of a dressing mechanism forming a part of the invention.
Figure 42:
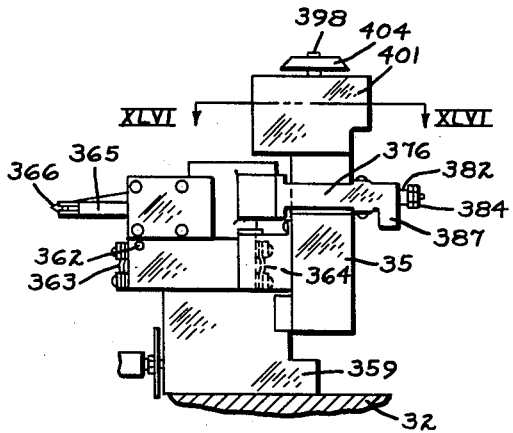
FIG. 42 is a side elevational view of the dressing mechanism taken along the line XLII—XLII of FIG. 41.
Figure 43:
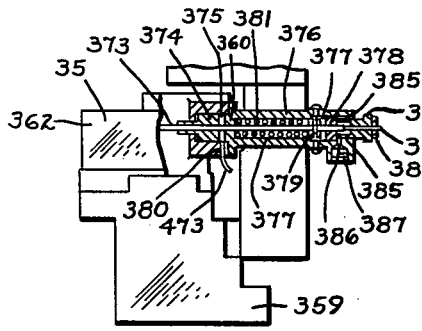
FIG. 43 is a partially-sectioned side elevational view of the dressing mechanism taken along the line XLIII—XLIII of FIG. 44.
Figure 44:
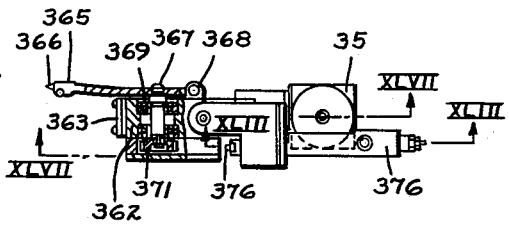
FIG. 44 is a plan view of the dressing mechanism with portions broken away.
Figure 45:
FIG. 45 is a side elevational view of a portion of the dressing mechanism as observed along the line XLV—XLV of FIG. 41.

The wheelhead portion 31 is shown in detail in FIGS. 29 through 33. As is evident in the drawings, the wheelhead portion 31 carries the wheelhead 41 at one side, this wheelhead being of the air-turbine high-speed type carrying a spindle 42 and an abrasive wheel 43. As is particularly evident in FIGS. 29 and 32, the wheelhead portion is mounted on two rails 248 and 249 extending upwardly from the base 29. For that purpose the wheelhead portion is provided with a forward apron 251 having a generally rectilinear groove 252 and a rear apron 253 having a rectangular groove 254, the front rail 248 lying within the groove 252 and the rear rail 249 lying within the groove 254. Joining the front apron 251 to the rear apron 253 is an intermediate web 255. Located in the rearward portion of the groove 254 is a pressure member 256 which is pressed forwardly by two coil springs 257 and 258 which lie in suitable bores in the apron facing toward the rail 249. As is best seen in FIG. 31, the wheelhead portion 31 consists of an upper portion 259 and a lower portion 261 which are pivotally joined together at the side adjacent the wheelhead 41 by a hinge pin 262, the axis of the hinge pin lying directly under the spindle 42 and the abrasive wheel 43. At a position beyond the wheelhead the upper portion 259 is provided with a pair of upwardly-directed pins 263 and the lower portion 261 is provided with a pair of downwardly-directed pins 264 overlying and in alignment with the pins 263. A pair of coil springs 265 reside around the two sets of pins and tend to keep the upper and lower portions separated while at the same time permitting pivotal movement about the hinge pin 262. The upper member 259 is formed as a yoke having two rearwardly directed arms 266 and 267 defining an open space between them covered by a sheet metal closure plate 268. Extending upwardly from the lower member 261 in the space between the two arms is a block 269 having a bore 271 which, in turn, carries a piston 272. The bore 271 is connected at its inner end to a source of pressure oil (not shown) by means of a conduit 273. A stop member 274 extends horizontally through the arm 259 and is threadedly engaged therewith. The adjusting knob 51 mounted at the outer end of the stop member provides its adjustment. Through the arm 267 extends a threaded stop screw 275; a coil spring 276 extends around the stop screw and between the arm 267 and the block 269. The upper portion 259 of the wheelhead portion 31 is provided at the front side with a downwardly-directed horizontal surface 277 which rests on and is slidable over a matching upwardly-directed surface 278 on the lower portion 261. In a similar manner the upper portion 259 is provided at the rear with a downwardly-directed surface 279 which rests on and is slidable over a similar horizontal upwardly-directed surface 281 on the lower portion 261. The surfaces 277 and 278 are particularly well shown in FIG. 33 wherein is shown the wheelhead swing-indicating mechanism 52. A vertical pin 282 extends upwardly from the lower portion 261 of the wheelhead portion and is notched to provide a rearwardly-directed vertical plane surface 283. Mounted on the upper portion 259 is an indicator 284 of the usual type having a movable pin 285 which engages the surface 283 of the pin 282. A closure plate 286 extends over the recess in the upper portion 259 which carries the swing-indicating mechanism. Conduits 287 enter the rear part of the upper portion 259 and are connected by suitable passages to the wheelhead 41 for providing actuating air thereto. It should be noted that conduits are provided to furnish not only pressure air for the turbine of the wheelhead but also air-mist lubrication and in some cases coolant.

*Cross-Slide Switch Unit*

The cross-slide switch unit 37 is shown in detail in FIGS. 34, 35, and 36. It generally consists of a bracket 288 which is bolted to the secondary base 32 and a switch box 289 which is supported on an angle bracket 291 which is fastened to the base 29. Located within the box are three electrical switches 292, 293 and 294. Through the front wall of the box which faces the bracket 288 extend contact members 295, 296, and 297, aligned respectively with the actuating portions of the switches 292, 293 and 294. Adjustable fingers 298, 299 and 301 extend through an extending part of the bracket 288 and are aligned respectively with the contact members 295, 296 and 297. The contact member 297 is typical and consists of a bolt which is adjustable in the front wall of the box 289 and which has a bore extending through it within which is a slidable plunger. The plunger is slightly longer than the screw to provide for the transmission of pressure between the adjustable finger 301 and the switch 294. The finger 301 is typical and consists of a shaft 302 having a stem 303 which extends forwardly of the bracket 288 and a hollow sleeve 304 which extends rearwardly of the bracket 288. The hollow sleeve 304 has slidably mounted therein a contact pin 305 with a thin portion which extends rearwardly to contact the contact member 297 and with an enlarged portion which slides within the hollow sleeve 304. A coil spring 306 lies within the hollow sleeve 304 and presses against the pin 305 to cause it to take a rearward position relative to the bracket 288. A hollow nut 307 is threaded around the rearwardly extending end of the sleeve 304 and provides an adjustable means for limiting the rearward motion of the pin 305 because of the engagement of the enlarged portion with the inside surface of the nut. The stem 303 has attached thereto a knob 308 which is suitably spring-loaded to take up the backlash in a threaded engagement between the stem 303 and the bracket 288. Rotation of the knob 308 causes adjustment of the shaft 302 forwardly or rearwardly of the bracket 288.

*Oscillating Mechanism*

The details of the oscillating mechanism 39 are shown in FIGS. 37 through 40. As is particularly evident in FIG. 37, the wheelhead portion is provided with two parallel side members joined by a bar 308 which extends horizontally from front to back. A block 309 is fastened to the base 29 and is formed with a horizontal bore 311 in which is slidably carried a piston 312. From the piston extends a piston rod 313 which is bolted to a vertical wall 314 of the lower portion 261 of the wheelhead portion 31. This vertical wall is the same wall on which the pins 264 and the springs 265 are connected in FIG. 31. Overlying the left hand side of the bore 311 is a cylinder head 315 having an aperture and a seal whereby the piston rod 313 may slide smoothly back and forth. The cylinder head is bolted to a portion of the base 29 by means of a bolt 316, as is evident in FIG. 39. Furthermore, laterally extending flanges 317 and 318 are formed on the block 309 and these are also securely fastened to the base 29. Otherwise, the block is freestanding. The piston 312 is provided with a counterbore 319 and in this counterbore is slidably carried a plug 321. This plug is connected against rotation by a slot-and-pin arrangement and a coil spring 322 biases it outwardly of the counterbore; it is prevented from leaving the counterbore entirely by the slot-and-pin arrangement. At the right hand end of the bore 311 the wall of the block 309 is provided with an adjustable stop pin 323 against which the plug 321 strikes when the piston is at the right end of the bore. The right hand end of the bore is connected by a passage 324 to a source of pressure oil, while the other end of the bore is similarly connected by a passage 325 to a source of pressure oil. It should be noted that the plug 321 is considerably smaller than the counterbore 311 and is held centrally thereof by the pin and slot arrangement, so that when the plug strikes the pin 323 on the piston's movement to the right, oil may gradually be squeezed out of the dead end of the counterbore past the sides of the plug and so that the piston may proceed further at a reduced rate of speed and with a certain degree of damping. At the right hand end of the block 309 is a vertical camshaft 326 carried in tapered roller bearings 327 and 328. Keyed to an intermediate portion of the shaft is a pulley 329 and above that and separated from it by a collar 331 is fastened a cam 332. The pulley 329 is connected by a flexible belt to the motor 46, as is evident in FIGS. 5 and 6. The cam 332 consists of an inner member 333 and an outer member 334 which have mating cylindrical surfaces which are eccentric to the shaft 326. As the outer member 334 is rotatably adjusted relative to the inner member 333, its throw relative to the axis of the shaft 326 is increased or diminished, depending on the position of the mating eccentric surfaces. A cylinder 335 is threaded centrally through the bar 308 of the wheelhead portion and is provided with a central bore 336. In this bore slides a piston 337 (see FIG. 40) having a piston rod 338 which is fastened to a cam follower body 340. The body is provided with a horizontal slot in which resides a cam follower roller 341 rotatably mounted on a vertical shaft 342. Two horizontal guide pins 343 and 344 extend laterally from the body 340 and are carried in bores 345 and 346, respectively, formed in the bar 308. The left hand end of the bore 336 is provided with a head 347 having an aperture therethrough with seals which smoothly guide the piston rod 338. At the other end of the bore it is provided with a plug 348 having a central bore 349. Over the plug 348 extends a head 351 having an inwardly-facing counterbore 352 and a rubber-like diaphragm 353 extending across the counterbore 352 and clamped at the edges between the plug 348 and the head 351. The piston 337 is provided at its right hand end with a tapered stem 354 which is narrowest at the outer end and which at its root portion is approximately the same diameter as the bore 349. A coil spring 355 extends between the piston 337 and the plug 348 and serves to maintain the piston 337 normally at the left side of the bore. A passage 356 enters the outer end of the stem 354 and opens at its other end at the piston rod end of the piston 337. Another passage 357 extends from one end to the other of the piston and contains a checkvalve 358 which is oriented to permit passage of fluid from the rod end of the piston to the other end, but prohibits a reverse flow of fluid.

*Dressing Mechanism*

The dressing mechanism 35 is shown in detail in FIGS. 41 through 49. A base 359 is fastened to the secondary base 32 by means of T-bolts 361 contained in a T-slot extending along the bottom of the base. A body 362 is supported above the base 359 on flexible reeds 363 and 364. An arm 365 carrying a diamond 366 at its outer end is pivoted on a transverse shaft 367. A suitable adjustable stop 368 is associated with the end of the arm opposite the diamond for limiting swinging movement from a horizontal operative position to an upwardly-extending inoperative position. The shaft is rotatably mounted in a roller bearing 369 in the body 362 and has keyed to it a spur gear 371. Engaging the spur gear is a rack 372 fastened to the forward end of a piston rod 373. The piston rod has attached thereto a piston 374 (best shown in FIG. 43) which is slidably carried in a bore 375 of a cylinder 376 fastened to the body 362. The piston rod 373 extends rearwardly through the piston 374 and through a wall 360 having an aperture provided with seals through which the rod is slidably movable. On the other side of the wall the piston extends into a long bore 377 and terminates in a piston 378 which is slidable in the bore. A collar 379 is fastened to the piston rod and a coil spring 381 surrounds the piston rod within the bore and extends between the collar 379 and the aforementioned wall 360. The rearmost end of the piston rod 373 is provided with a reduced threaded portion 383 on which a head 382 is threadedly mounted; a nut 384 locks the head to the piston rod. The head is provided with grooves 385 along the bore 377. Adjacent the end of the cylinder 376 an air opening 386 leads to a passage 387 which is connected to an air-interlock means. When the piston rod is at its extreme right position in FIG. 43, which places the diamond in its raised position, the piston 378 covers the opening 386 and indicates to the air-interlock means the fact that the diamond is in its inoperative position.

Figure 46:
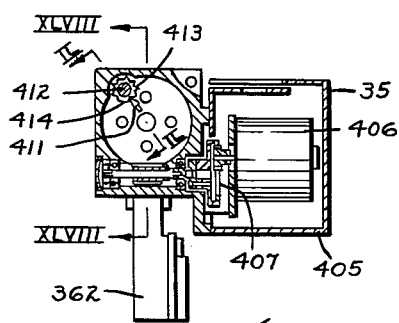
FIG. 46 is a horizontal sectional view of the dressing mechanism taken along the line XLVI—XLVI of FIG. 42.
Figure 47:
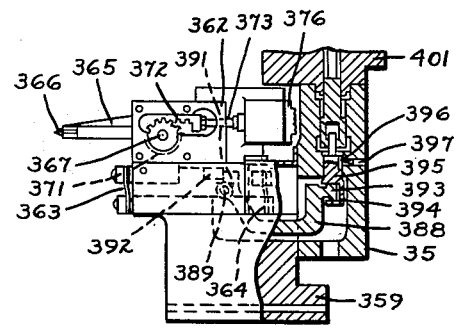
FIG. 47 is a vertical sectional view of the dressing mechanism taken along the line XLVII—XLVII of FIG. 44.

In FIG. 47 it can be seen that a lever arm 388 is hingedly attached to the base 359 by a horizotal hinge pin 389. The lever arm 388 is provided with a short extension 391 which is spaced from the axis of the hinge pin 389 and which engages a hardened metal insert 392 extending downwardly from the body 362 and having a vertical surface against which the extension 391 presses. The lever arm 388 is formed at the other end with a rounded horizontal knob 393 which is enclosed within a forwardly-facing opening in a clevis 394 formed on the lower end of a vertical shaft 395. The shaft extends upwardly through a vertical bore 396 formed in the body and is engaged at its rearward side by an adjustable pressure member 397 engaging a flat rearwardly-directed surface formed on the shaft, as is evident in FIG. 48. The upper end of the vertical shaft 395 is threaded into the lower end of a vertical shaft 398. The lower end of the shaft 398 is threaded into a threaded bore 399 in the body 362. Mounted on the body overlying the bore 399 is a gear housing 401 through which the shaft 398 passes. In the housing keyed to the shaft 398 is a worm gear 402 which is engaged by a worm 403. The shaft 398 extends well above the top of the housing 401 and is provided with an indicating collar 404. The worm extends laterally out of the gear housing 401 into a motor enclosure 405, as is evident in FIG. 46, and in this enclosure is mounted an electric motor 406 whose output shaft is connected through reducing gearing 407 to the worm.

Figure 49:
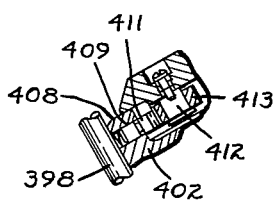
FIG. 49 is a vertical sectional view of the invention taken along the line XLIX—XLIX of FIG. 46.

Referring now to FIGS. 46 and 49, it can be seen that the worm gear 402 has an elongated hub 408 which extends upwardly through the gear housing. This hub is provided with a lateral bore 409 which extends laterally away from the shaft 398 and carries a detent finger 411. Mounted on the top cover of the housing 401 and extending downwardly is a stub shaft 412 on which is mounted a star wheel 413. As is evident in FIG. 46, the star wheel is provided with 8 notches but also with a portion 414 which has no notch. The operation is such that every time the worm gear 402 rotates, the finger 411 moves into one of the notches on the star wheel and moves the star wheel by a small increment. At extreme positions of the shaft 398 in its up and down movement, the finger strikes the portion 414. If it does so strike the portion 414, a considerable torque force and resistance to rotation of the shaft 398 takes place, having the result of stalling the motor 406. Rotation of the shaft 398, of course, causes vertical movement within the body 362 because of its engagement with the threaded bore 399.

*Hydraulic and Pneumatic Circuitry*

FIG. 50 shows in a schematic diagram the hydraulic and air connections in the machine. A hydraulic pump 415 has its output connected through a check valve 416 to a relief valve 417. The relief valve is connected by a conduit 418 to the oil tank (not shown). The relief valve is also connected by a conduit 419 to a junction 421. The junction is connected by a conduit 422 to one side of a filter 423. The other side of the filter is connected by a conduit 424 to lubricate the sliding movement between the rail 248 on the base and the surfaces of the groove 252 on the wheelhead portion. The filter is also connected by a conduit 425 to perform the same lubricating operation between the rear rail 429 of the base and the surfaces of the groove 254 in the wheelhead portion. The conduit 424 is also connected through a relief valve 426 to the sump tank and the conduit 425 is connected through a similar relief valve 427 to the tank. The junction 421 is also connected through a conduit 428 to the passage 325 leading through the body 309 to the piston rod side of the piston 312. The passage 324 extending through the body from the other end of the bore is connected by a conduit 429 to one side of the hand throttle 431 which is actuated by the handle 25 at the front of the machine. The output of the throttle 431 passes through a conduit 432 to a solenoid valve 433. This solenoid valve has a body 434 and a spool 435 which is movable by a Press Speed coil 436 at one end and a Grind Speed coil 437 at the other end. The valve 433 is a three-way valve having a central inlet port 438 to which the conduit 432 is connected. It has an outlet port 439 which is connected hydraulically to the port 438 when the spool 435 is in its left hand position, i.e., when the Press Speed coil 436 is energized. The port 439 is connected by a conduit 441 to one side of a Table Dress Speed throttle 442 whose setting is regulated by the Dress Speed knob 26 on the front of the machine. The other side of the throttle 442 is connected by a conduit 443 to the third port 444 of the valve 433. The conduit 443 is also connected by a conduit 445 to the passage 244 of the compensation cylinder bore 239. The conduit 445 also joins a conduit 446 leading to a Table Direction valve 447 having a spool 448 and a coil 449. The conduit 446 is connected to a port 451 of the valve and the valve is provided with two other ports 452 and 453. The spool 448 is configured so that, when the coil 449 is not energized, the ports 451 and 452 are in communication and the port 453 is cut off from communication with them; when the coil 449 is energized, however, the spool takes a position such that the port 451 is in communication with the port 453 and the port 452 is not in communication with the other two. A conduit 454 connects the port 453 to the tank of the oil system through a check valve 455. The port 452, on the other hand, is directly connected to the junction 421 and, therefore, receives positive oil pressure at all times; the connection of the port 452 to the junction 421 takes place through a conduit 456. The conduit 456 is also connected to a port 457 of a Back-Off valve 458 which has a spool 459 and an energizing coil 461. The valve also has ports 462 and 463. The spool is formed in such a way that, when the coil 461 is not energized, the ports 457 and 462 are in communication, but the port 463 is not in communication with either of them. When the coil is energized, however, the port 462 is brought into communication with the port 463 which, in turn, is attached to the conduit 454 discharging to the oil tank. The junction 421 is also connected through the conduit 456 to a port 464 of a Dresser valve 465 having a spool 466 and an actuating coil 467. The valve also has a port 468 which is connected to discharge through the check-valve 455. The valve also has a port 469 and a port 471; the spool 466 is so configured that when it is in the left hand position, i.e., the coil 467 is not energized, the port 469 is connected to the port 464 and receives high pressure oil from the junction 421. In this condition the port 471 and the port 468 are connected, the port 468 is being connected to exhaust. When the coil 467 is energized, however, the spool takes up the right hand position in which the port 471 is connected to the port 464 and to high pressure oil, while the port 469 is connected to the port 468 and to exhaust. The port 469 is connected by a conduit 472 to the bore 271 of the wheelhead swinging mechanism 49. The port 471 is connected to the dressing mechanism 35 by means of a conduit 473. The port 471 is also connected to the passage 243 at one end of the bore 239 of the compensating mechanism 38. The port 462 of the Back-Off valve 458 is connected by a conduit 474 to the passage 147 entering the cylinder containing the retraction piston 143 on the work slide 33.

A source of pressure air 475 is connected through a filter 476, a valve 477, and a pressure regulating valve 478 to the air turbine portion of the wheelhead 41. The source 475 is also connected through a filter 479, a pressure regulating valve 481 and a mist lubricant generator 482 to the wheelhead bearings. The common sides of the filter 479 and the pressure regulating valve 481 are connected to one side of a pressure regulating valve 483, the other side of which is connected to a mist lubricating generator 484. The other side of the mist lubricating generator is connected by a conduit 485 to a Loading valve 486 having a spool and an actuating coil 488. A port 489 of the valve is connected to the conduit 485 and the valve is provided with a port 491 which is connected to the atmosphere, a port 492, and a port 493. The spool 487 is formed so that, when the coil 488 is unenergized, the spool is in a left-hand position and the port 493 communicates with the port 491 and the port 492 communicates with the port 489; when the coil is energized and the spool is in a right-hand position, the port 492 is connected by the port 491 to exhaust, while the port 489 is connected to the port 493. The port 492 is connected by a conduit 494 to the passage 123 at one end of the loading cylinder 112, while the port 493 of the valve 486 is connected by a conduit 495 to the passage 118 entering the other end of the bore 112 of the loading cylinder. The line 495 is also connected by a conduit 496 to the passage 176 of the cam reset cylinder bore 175.

The conduit 485 is also connected to a port 497 in the Gauge Retract valve 498 having a spool 499 and an actuating coil 501. The valve also has a port 502 which is open to the atmosphere and a port 503 which is connected by a conduit 504 to a gauge retract cylinder 505. The spool 499 is formed so that when the coil 501 is energized, the spool is in a right hand position and the port 503 is connected to the port 502 and to exhaust; when the coil is unenergized and the spool is in a left hand position, the port 503 is connected to pressure air from the port 497. The gauge retract cylinder 505 is connected to move a gauge 506 which is mounted behind the workhead in line with the axis of the workpiece. At a certain time in the cycle the gauge attempts to enter the bore in the workpiece and, when it accomplishes this, this is an indication that the size of the workpiece has been reached and a switch 631 associated with the gauge closes to terminate the grinding cycle. The conduit 485 is connected through a pressure regulating valve 507 to an actuating cylinder associated with the gauge 506, which cylinder serves to move the gauge for admission into the bore in the workpiece.

The common sides of the pressure regulating valve 481 and the mist lubricating generator 482 are connected through a filter 508 to a conduit 509. This conduit is connected to a nozzle 511 which is associated with the gauge 506 in such a way as to obtain a pressure rise when the gauge 506 is in a certain position; the line 509 is also connected to an air switch 512 which closes when the nozzle indicates an increase in pressure due to the presence of the gauge. The conduit 509 is also connected by a conduit 513 to the nozzle 387 in the dresser mechanism 35, which nozzle is opened or closed depending upon the position of the piston 378. The conduit 513 is also connected to an air switch 514 which opens or closes, depending on the flow of air through the nozzle 387. Line 509 is also connected by a conduit 515 to a nozzle 516 which is mounted at the top of the abutment 157 at the front of the secondary base 32, the nozzle being in position to indicate the arrival of the table 33 at a certain position. Also connected to the conduit 515 is an air switch 517 which opens and closes in response to the indication of air flow from the nozzle 516 and which serves to change the machine from coarse feed to fine feed and to release the plug gauge 506 so that it can attempt to enter the bore of the workpiece to eventually terminate the grinding cycle.

A source of liquid coolant 518 under pressure is connected by a conduit 519 to a three-way valve 521 which, in turn, is connected to a conduit 522. The source 518 is also connected to a conduit 523 leading to a relief valve 524 whose output is connected by a conduit 525 to the third port of the valve 521 and to an indicating gage 526. By use of the valve 521 it is possible to connect the conduit 522 either to the conduit 519 having a high pressure coolant from the source 518 or to the conduit 525 having low pressure coolant from the relief valve 524. The other end of the conduit 522 is connected to the passage 151 leading through the piston 148 of the feed cylinder associated with the table 33 and the block 152.

Electrical Circuitry

Figure 51:
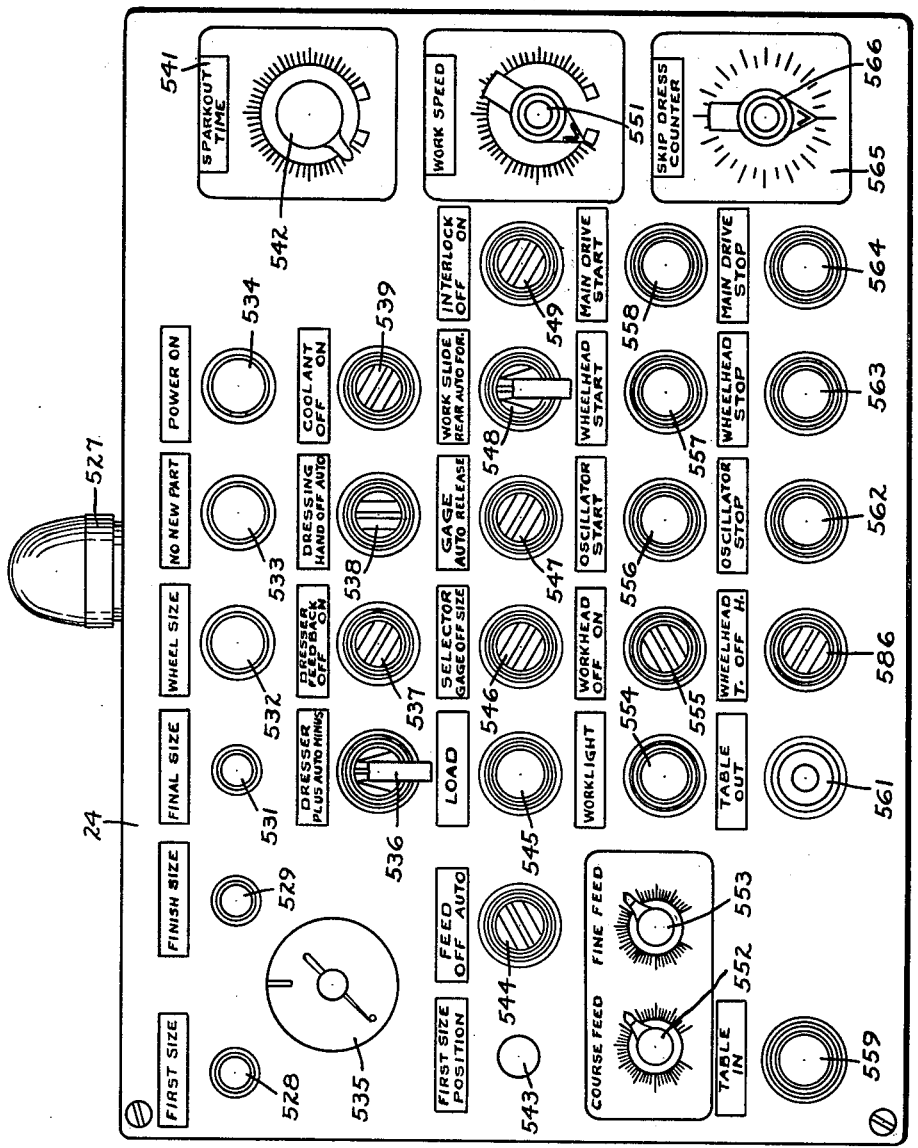
FIG. 51 is a view of the front of the electrical control panel.

FIG. 51 shows the electrical control panel 24. At the top of the housing is located the Wheel Change lamp 527. Arranged in a row all along the top of the panel is the First Size lamp 528, the Finish Size lamp 529, the Final Size lamp 531, the Wheel Size lamp 532, the No New Part lamp 533, and the Power On lamp 534. In the next row is located an indicator dial 535, a Dresser Adjusting knob 536, the Dresser Feedback switch 537, a Dressing switch 538, and a Coolant switch 539. To the right of the first two rows is the Spark-Out timer 541 and its adjusting knob 542. In the next row is located the First Size Position knob 543, a Feed switch 544, a Load button 545, a Selector switch 546, a Gauge switch 547, a Work Slide switch 548, and an Interlock switch 549. To the right of this row is the Work Speed Adjusting knob 551. Extending horizontally along in the next row is the Coarse Feed adjusting knob 552, the Fine Feed adjusting knob 553, the Worklight switch 554, the Workhead switch 555, the Oscillator Start button 556, the Wheelhead Start button 557, and the Main Drive Start button 558. On the bottom row is a Table In button 559, a Table Out button 561, the Oscillator Stop button 562, a Wheelhead Stop button 563, and a Main Drive Stop button 564. To the right of the bottom row is the skip-dress counter 565 and its adjusting knob 566.

Referring to FIGS. 52, 53, 54, 55, 56, and 57, which schow schematically the electrical circuits used in the apparatus, it can be seen that a three-phase 440-volt alternating-current supply 567 is connected through the normally-open contactor of a motor starter 568 to the hydraulic pump motor 415 and the coolant pump motor 518. The source 567 is also connected through normally-open contactors of a motor starter 569 to the oscillator motor 46. Two of the three-phase lines are connected to the primary of a transformer 571 whose secondary is connected to 110-volt alternating-current power lines 572 and 573. A high frequency A.C. source 572A is connected through the normally-open contactors of a motor starter 570 to the wheelhead motor 574. In a similar manner, another wheelhead motor 575 is connected through normally open contactors of a motor starter 576 to a source of high frequency alternating current power 577. As is usually the case, the two motors 574 and 575 are in line and integral with the wheelhead 41 so that the wheelhead can be operated at different frequencies depending upon which motor is operating and which is connected to its high frequency alternating current source. In describing the connections, the description will follow the circuitry from FIG. 52 to FIG. 57, although this particular geometric relationship is, of course, not necessary in a practical embodiment of the machine. In the case of relays, the standard nomenclature will be used, the relays having the letters CR standing for control relays and those using the letters PR standing for power relays. The coil, the normally-open contactors, and the normally-closed contactors being shown in the conventional manner.

First of all, the Power On lamp 534 on the panel 24 (FIG. 51) is connected directly from the line 572 to the line 573. This lamp is of the "push-to-test" type, whereon pressure on the front of the lamp when it is pressed will indicate whether the power is on in the machine. One side of the normally-closed Main Drive Stop button 564 is connected to the line 572; the other side is connected through the normally-open Main Drive Start button 558 to one side of the coil of the motor starter 568 which starts the coolant motor 518 and the hydraulic pump motor 415. The other side of the coil is connected to the power line 573. It should be noted that thermal overload switches are in series with the motor starter, in the usual manner. Also, an interlock contact of the starter 568 is connected across the button 558.

One side of the normally-closed Oscillator Stop button 562 is connected to the line 572, while the other side is connected to one side of the normally-open Oscillator Stop button 566, the other side of which is connected through the motor starter 569 to the line 573. An interlock contactor of the motor starter 569 is connected across the button 556. The Coolant button 539 is connected in series with the normally-open contactor of the power relay 5PR and the actuating coil 578 of the coolant valve 579 (see FIG. 51), these three elements being connected from the line 572 to the line 573. The normally-open Worklight switch 554 is connected in series with the worklight 581 from the line 572 to the line 573; the worklight 581 is normally attached above the workpiece area and shines on the workpiece in the wheel during the working cycle. One side of a normally-open contactor of a relay 6PR is connected to the line 572 and the other side is connected through the Wheel Change lamp 527 to the line 573.

The line 572 is connected to one side of another normally-open contactor of the relay 6PR, the other side of which is connected to one side of a normally-open contactor of a relay 13CR, the other side of which is connected through a normally-closed portion of the Dresser button 538 and the Wheel Size light 532 to the line 573. The Wheel Size light is of the "push-to-test" type which may be pressed to indicate whether the light has burned out or not.

The line 572 is also connected to one side of a normally-closed contactor of a relay 3CR, the other side of which is connected to one side of a normally-open contactor of a relay 7CR, the other side of which is connected through the No New Part light 533 to the line 573; the lamp 533 is also of the "press-to-test" type in which the face of the lamp may be pressed to connect it directly across the power lines to determine whether its filament is still operative.

The line 572 is connected to one side of a normally-open contactor of a power relay 2PR, the other side of which is connected to a junction 582. The junction 582 is connected to one side of a normally-open contactor of the relay 3PR and the other side of this connector is connected to one side of a normally-closed contactor of the relay 3PR; the other side of this last-named contactor is connected through a 3.75 microfarad capacitor 583 to the power line 573. The junction 582 is also connected through a normally-closed contactor of the relay 3PR to one side of a normally-open contactor of the relay 3PR, the other side of which is connected to the capacitor 583 and also to the line 573; a field coil of the workhead positioning motor 194 is connected on one side between the first-named set of contactors and on the other side between the last-named set of contactors of the relay 3PR; the junction 582 is connected through the armature coil of the same motor 194 to the power line 573.

Figure 53:
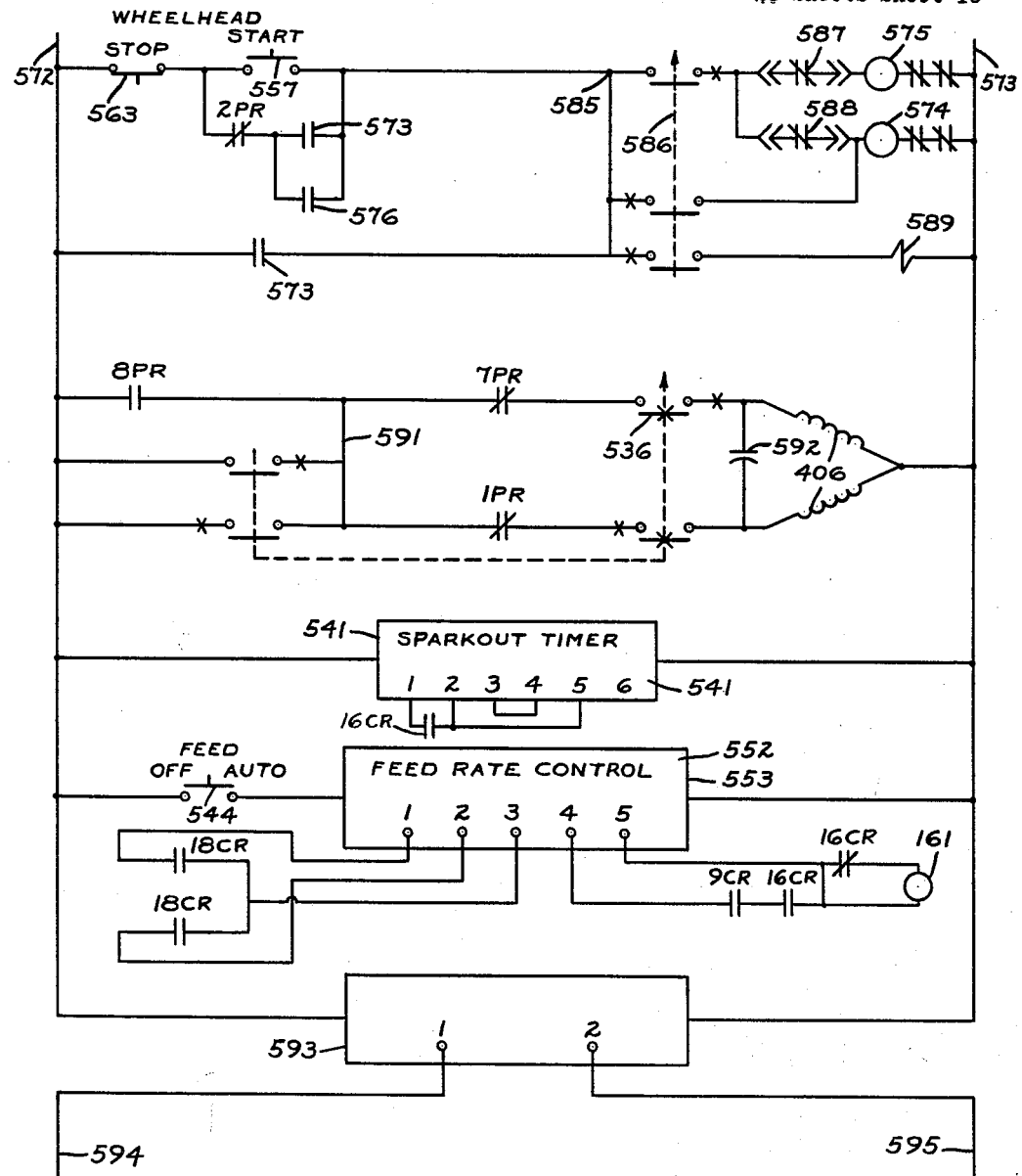

Referring now to FIG. 53, one side of the normally-closed Wheelhead Stop button 563 is connected to the line 572 and the other side is connected through the normally-open Wheelhead Start button 557 to a junction 585. A common point between the buttons 563 and 557 is connected to one side of a normally-closed contactor of the power relay 2PR, the other side of which is connected to one side of the normally-open contactor of the motor starter 573, the other side of which is connected to the junction 585. Across the above-mentioned contactor of the starter 573 is connected a similar normally-open contactor of the motor starter 576. The electrical control panel 24 is provided at the front with a Wheelhead Selector switch 586 which may be used to select the use of a turbine wheelhead or a high-frequency motor wheelhead. The junction 585 is connected through a contactor of the switch 586, which contactor is closed when the switch is set on high frequency, the other side of which is connected through a temperature control 587, through the motor 575, and through overload switches to the line 573. Similarly, the other side of the last-mentioned contactor of the switch 586 is connected through a temperature control 588 and the high frequency motor 574 to the line 573. The junction 585 is also connected through another contactor of the switch 586, this contactor having the function that it is closed when the switch is set on "turbine." The other side of this switch is connected between the temperature control 588 and the motor 574. The line 572 is connected to one side of a normally-open auxiliary interlock contactor of the motor starter 573, the other side of which is connected through one contactor of the switch 586 and through an air turbine solenoid 589 to the other power line 573; this last-named contactor associated with the switch 586 is closed when the switch 586 is in "turbine" position. The air turbine solenoid 589 has the function of providing turbine air to the wheelhead when the coil is energized.

The power line 572 is also connected to one side of a normally-open contactor of a power relay 8PR, the other side of which is connected to one side of a normally-closed contactor of the relay 7PR, the other side of which is connected to one side of a contactor of the Dresser switch 536, which contactor is closed when the switch is on "minus"; the other side of this last-named contactor is connected through one field coil of the dresser motor 406 to the power line 573. The line 572 is also connected through a contactor of the switch 536 (which is closed when the dresser switch 536 is on "minus"), and this switch is connected at its other side to a common junction 591 between the normally-open contactor of the relay 8PR and the normally-closed contactor of the relay 7PR. Similarly, the line 572 is connected through another contactor of the switch 536 to the junction 591, this last-named contactor having the function of being closed when the dresser switch 536 is turned to "Plus." The junction 591 is also connected through a normally-closed contactor of a relay 1PR to one side of another contactor of the switch 536, the other side of which is connected through another field coil of the dresser motor 406 to the line 573; this last-named contactor is in closed position when the dresser switch 536 is in "Plus" position. The two coils of the motor 406 are oriented such that the motor will drive in one direction when one of them is energized and in the other direction when the other coil is energized. Across the ends of these coils which are away from the line 573 is connected a capacitor 592. The spark-out timer 541 is connected across the lines 572 and 573 and is provided with a normally-open contactor of a relay 16CR by which the timing action is started.

The feed rate control 552 and 553 is connected from the line 572 to the line 573 through the Feed button 544. The feed rate control is provided with binding posts numbers 1, 2, 3, 4, and 5 which are connected to various relays and to the feed motor 161; the binding post No. 1 is connected to one side of a normally-closed contactor of a relay 18CR, the other side of which is connected to a binding post No. 3. A binding post No. 2 is connected to a normally-open contactor of the relay 18CR, the other side of which is connected to the binding post No. 3. A binding post No. 4 is connected through a normally-open contactor of a relay 9CR and through a normally-open contactor of the relay 16CR to one side of the motor 161; the other side of the motor 161 is connected through a normally-closed contactor of the relay 16CR and to a binding post No. 5. The side of the normally-open contactor of the relay 16CR which is attached to the motor 161 is connected to the side of the normally-closed contactor of the relay 16CR which is attached to the binding post No. 5. Finally, the power line 572 has the power line 573 are connected to a power supply 593 of the conventional type. The output of the power supply is connected to power lines 594 and 595 to provide them with 100-volt direct-current power.

Figure 54:
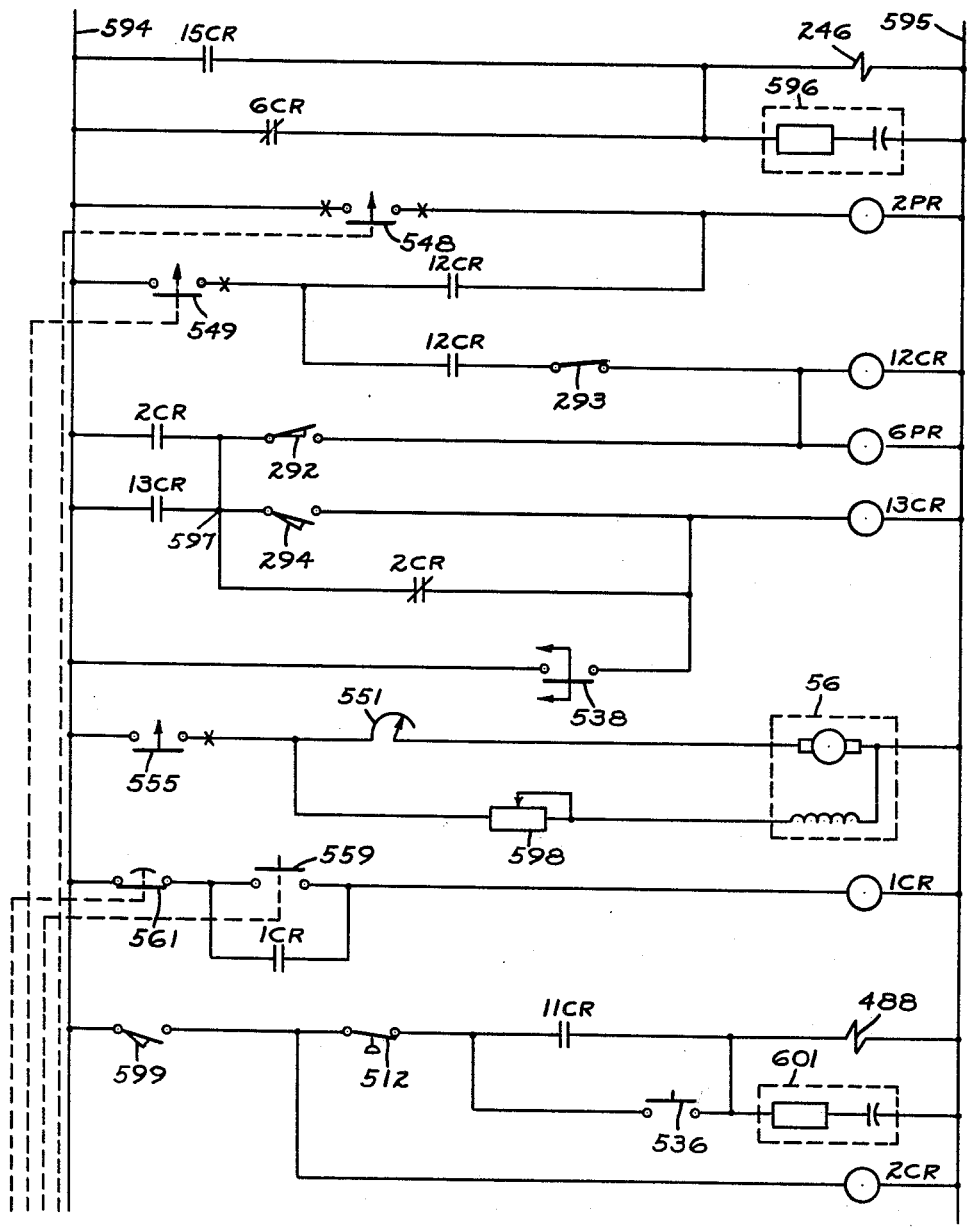

Referring now to FIG. 54, the elements which are connected between the direct current lines 594 and 595 are shown. First of all, a normally-open contactor of a relay 15CR is connected in series with the coil of the electric clutch 246 (in the compensating mechanism) from the power line 594 to the power line 595. The line 594 is connected on one side of a normally-closed contactor of a relay 6CR, the other side of which is connected through an arc suppressor 596 to the power line 595. The other side of the normally-closed contactor of the relay 6CR is also connected to a point between the normally-open contactor of the relay 15CR mentioned above and the coil of the clutch 246.

The line 594 is connected through a contactor of the Work Slide switch 548 and through the coil of the relay 2PR to the line 595; the contactor is closed when the switch 548 is either in "rear" or "forward" position, but is open when it is in "auto" position. The line 594 is also connected through a contactor of the interlock switch 549 and through a normally-open contactor of a relay 12CR to a point between the Work Slide switch contactor 548 and the coil of the relay 2PR; the contactor of the switch 549 is closed when the switch is turned to the "On" position. A point between the aforementioned contactor switch 549 and the normally-open contactor of the relay 12CR is connected through another normally-open contactor of the relay 12CR to one side of the Green Wheel switch 293 (see FIG. 35). The other side of this switch is connected through the coil of the relay 12CR to the line 595. The line 594 is connected through a normally-open contactor of a relay 2CR to one side of the Wheelwear switch 292 of FIG. 35, the other side of which is connected through the coil of the relay 6PR to the line 595. The sides of the coils of the relay 12CR and 6PR which are not connected to the line 595 are connected together. The line 594 is also connected to one side of a normally-open contactor of the relay 13CR and the other side is connected to a junction 597. Now, the junction 597 is connected through the Wheelsize switch 294 of FIG. 35 and through the coil of the relay 13CR to the power line 595. One side of a normally-closed contactor of the relay 2CR is connected to the junction 597 while the other side is connected to a common point between the switch 294 and the coil of the relay 13CR. Similarly, the point between the switch 294 and the coil of the relay 13CR is connected by a contactor of the Dresser switch 538 back to the line 594; this contactor having the function of being closed when the dresser switch 538 is in "Hand" position.

One side of the Workhead switch 555 is connected to the line 594 and the other side is connected through the adjusting potentiometer 551 and the armature of the workhead motor 56 to the line 595; the other side of the switch 555 is also connected through a variable resistor 598 and the field coil of the workhead motor 56 to the line 595. The switch 555 has the function of being closed when the switch is in "On" position.

The line 594 is connected to one side of the Table Out button 561, the other side of which is connected through the Table In button 559 (the first button being normally-closed, and the second button being normally-open) through the coil of a relay 1CR to the line 595. A normally-open contactor of the relay 1CR is connected across the Table In button 559. One side of a normally-open load-and-dress position switch 599 is connected to the line 594; this switch is located in position on the base 29 (see FIG. 4) to be contacted by a dog on the wheelhead portion 31. The other side of this switch is connected through the pressure switch 512 associated with the gage position, this last-named switch being normally-closed to indicate that the gage is not in the workpiece. The other side of the switch 512 is connected through a normally-open contactor of a relay 11CR and through the coil 488 of the load valve 486 to the line 595. A common point between the switch 512 and the last-named normally-open contactor of the relay 11CR is connected through the Load switch 536 and through an arc suppressor 601 to the line 595. A common point between the switch 536 and the arc suppressor 601 is connected to a common point between the coil 488 and the normally-open contactor of the relay 11CR. Lastly, a common point between the switch 599 and the switch 512 is connected through the coil of the relay 2CR to the line 595.

Figure 55:
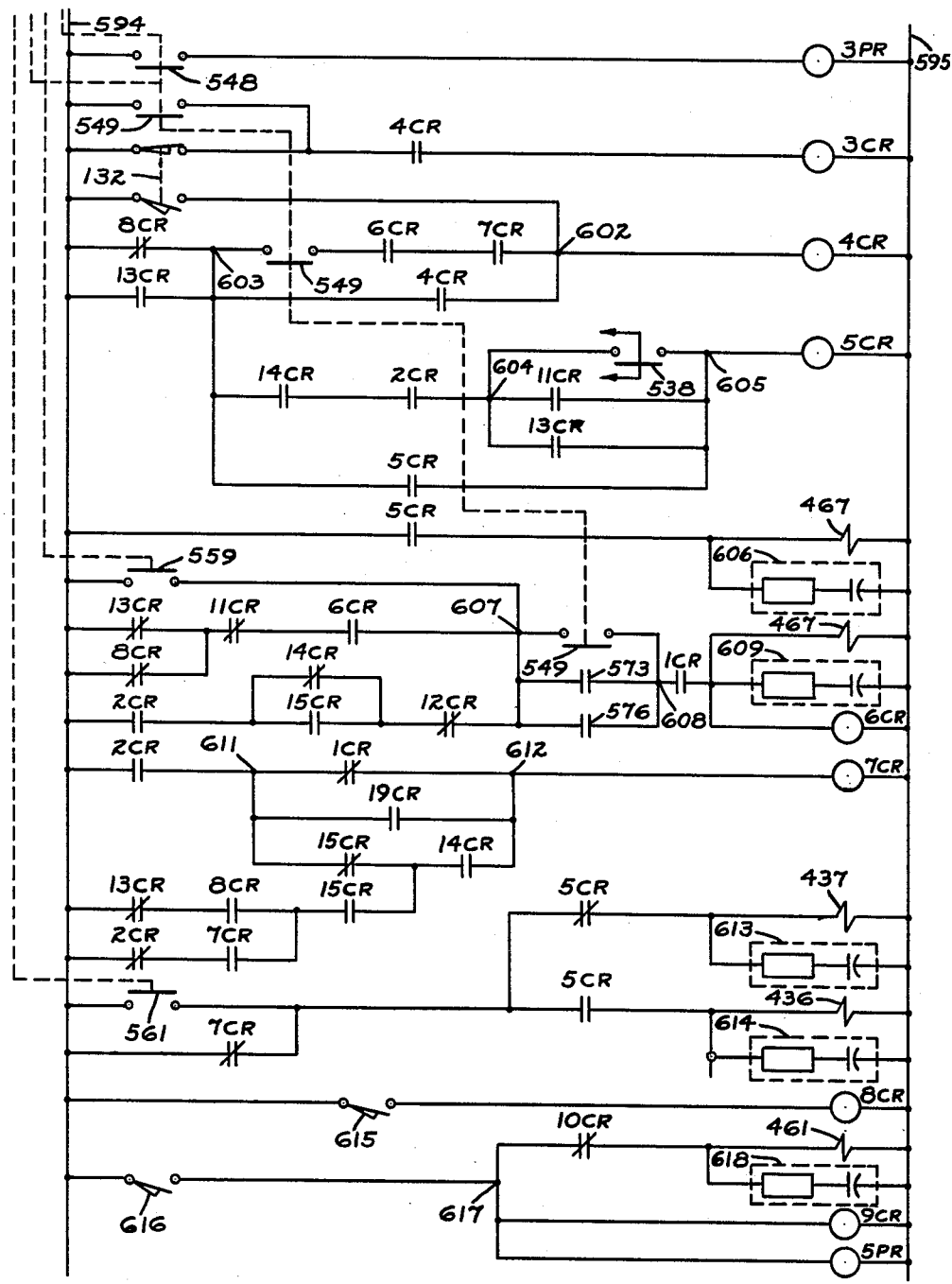

Referring to FIG. 55, the line 594 is connected through a contactor of the Work Slide switch 548 and through the coil of a relay 3PR to the line 595. The contactor has the function of being closed when the switch 548 is in the "Forward" position. Line 594 is connected through a contactor of the interlock switch 549 (whose function is to be closed when the interlock is in "Off" position), through a normally-open contactor of a relay 4CR, and through the coil of the relay 3CR to the line 595. The line 594 is also connected through a normally-closed portion of the workhead switch 132 (FIG. 11) to a common point between the last-mentioned contactor of the interlock switch 549 and the normally-open contactor of the relay 4CR. The switch 132 is also provided with a normally-open portion also which is closed by the workpiece during the loading operation and one side of this last portion is connected to the line 594 and the other side is connected to a junction 602. This junction is connected through the coil of a relay 4CR to the line 595. The line 594 is connected to the junction 602 by a normally-closed contactor of a relay 8CR through a normally-open contactor of the interlock switch 549 (which has the function of being closed when the interlock is in "Off" position), through a normally-open contactor of a relay 6CR, and through a normally-open contactor of the relay 7CR. The line 594 is also connected through a normally-open contactor of the relay 13CR not only to a common point 603 between the above-mentioned normally-closed contactor of the relay 8CR and the contactor of the switch 549, but also through a normally-open contactor of the relay 4CR to the junction 602. The junction 603 is also connected through a normally-open contactor of a relay 14CR and a normally-open contactor of the relay 2CR to a junction 604. The junction 603 is also connected through a normally-open contactor of a relay 5CR to a junction 605. The junction 605 is connected through the coil of the relay 5CR to the line 595. The junction 604 is connected through a contactor of the Dressing switch 538 to the junction 605 (this contactor having the function of being closed when the Dressing switch 538 is in "Hand" position). The junction 604 is also connected to the junction 605 through a normally-open contactor of the relay 11CR. The junction 604 is also connected to the junction 605 through a normally-open contactor of the relay 13CR.

The line 594 is connected through a normally-open contactor of the relay 5CR and through the coil 467 of the dresser valve 465 to the line 595. An arc suppressor 606 is connected around the coil 467. The line 594 is connected through a normally-open portion of the contactor of the Table In switch 559, the other side of which is connected to a junction 607. The junction 607 is connected through a contactor of the interlock switch 549 to a junction 608, the last-named contactor having the function of being closed when the interlock switch 549 is in the "Off" position. The junction 608 is connected through a normally-open contactor of the relay 1CR and through the coil 467 of the table valve 447 to the line 595. An arc suppressor 609 is connected around the coil 467. A common junction between the coil 467 and the last-mentioned normally-open contactor of the relay 1CR is connected through the coil of a relay 6CR to the line 595. The junction 607 is connected to the junction 608 through a normally-open contactor of the motor starter 573 and the junction 607 is also connected to the junction 608 through a normally-open contactor of the motor starter 576. The line 594 is connected through a normally-closed contactor of the relay 13CR, through a normally-closed contactor of the relay 11CR, and through a normally-open contactor of the relay 6CR to the junction 607. A common point between the last-mentioned normally-closed contactors of the relays 13CR and 11CR is connected back through a normally-closed contactor of the relay 8CR to the line 594. The line 594 is also connected to the junction 607 through a normally-closed contactor of the relay 2CR, through a normally-open contactor of a relay 15CR, and through a normally-closed contactor of the relay 12CR, all in series; a normally-closed contactor of the relay 14CR is connected across the above-mentioned normally-open contactor of the relay 15CR.

The line 594 is connected through a normally-open contactor of the relay 2CR to a junction 611, which junction is, in turn, connected through a normally-closed contactor of the relay 1CR and through the coil of the relay 7CR to the line 595. The junction 611 is also connected by a normally-open contactor of a relay 19CR to a junction 612 lying between the last-mentioned coil of the relay 7CR and the normally-closed contactor of the relay 1CR. The junction 611 is also connected through a normally-closed contactor of the relay 15CR and a normally-open contactor of the relay 14CR in series to the junction 612. The line 594 is connected through a normally-closed contactor of the relay 13CR, through a normally-open contactor of the relay 8CR, and through a normally-open contactor of the relay 15CR to a common point between the above-mentioned normally-closed contactor of the relay 15CR and the normally-open contactor of the relay 14CR. The line 594 is connected through a normally-closed contactor of the relay 2CR and the normally-open contactor of the relay 7CR to a common point between the above-mentioned normally-open contactors of the relays 8CR and 15CR.

The line 594 is connected through a normally-open contactor of the table "Out" switch 561 to one side of a normally-closed contactor of the relay 5CR, the other side of which is connected through the coil 437 of the Table Speed solenoid valve 434 to the line 595; an arc suppressor 613 extends around the coil. A normally-closed contactor of the relay 7CR extends around the contactor of the switch 561 from the line 594 to the common point between the contactor of the switch 561 and the normally-closed contactor of the relay 5CR. This last-named common point is also connected through a normally-open contactor of the relay 5CR and through the coil 436 of the Grind solenoid valve 434. An arc suppressor 614 extends around the coil 436. The line 594 is connected by an Inner Dress switch 615 (see FIG. 4) and through the coil of the relay 8CR to the line 595. The line 594 is connected to one side of a switch 615 (which is mounted on the front of the base 29 in FIG. 4) and is contacted by a dog on the wheelhead portion 31; the other side of the switch is connected to a junction 617. The junction 617 is connected through a normally-closed contactor of a relay 10CR and through the coil 461 of the back-off valve 458. An arc suppressor 618 is connected across the coil 461. The junction 617 is connected to the line 595 through the coil of the relay 9CR. The junction 617 is also connected to the line 595 through the coil of the relay 5PR.

Figure 56:
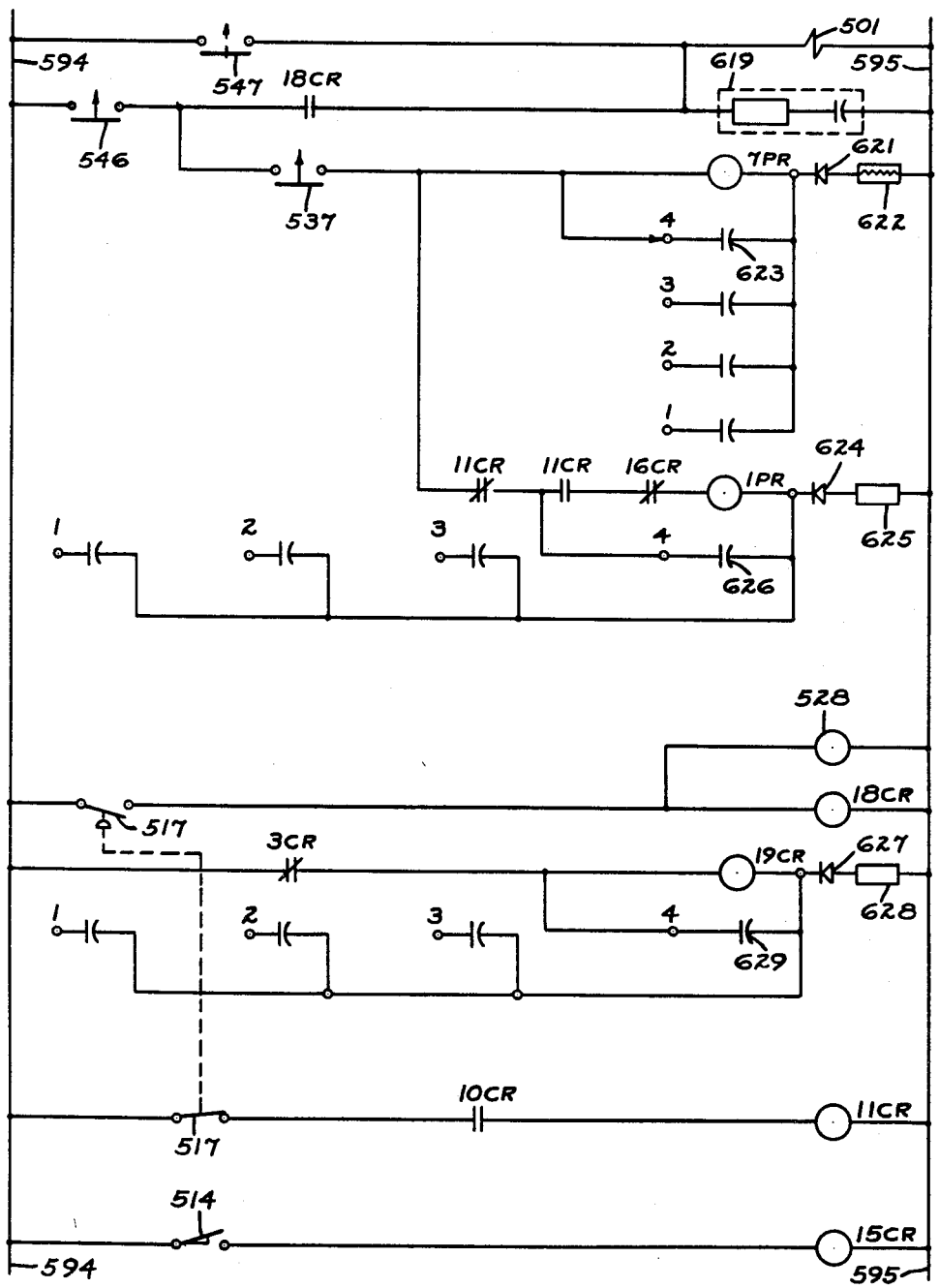

Referring now to FIG. 56, the line 594 is connected through a contactor of the Gauge switch 547 (which contactor is closed when the switch 547 is in the "Release" position) and through the coil 501 of the gauge release solenoid valve 498 (see FIG. 50) to the line 595. An arc suppressor 619 is connected around the coil 501. The line 594 is also connected to one side of a contactor of the Selector switch 546 (which switch is closed when the selector switch 546 is in the Gauge position). The other side of this switch is connected through a normally-open contactor of the relay 18CR to a common point between the above-mentioned contactor of the switch 547 and the coil 501 to which point the arc suppressor 619 is also connected. Now, a common point between the above-mentioned contactor of the switch 546 and the normally-open contactor of the relay 18CR is connected to one side of a contactor of the Dresser Feedback switch 537, this switch having the function of being closed when the switch is in "On" position. The other side of this switch is connected through the coil of a relay 7PR, a diode rectifier 621, and a resistor 622 all in series to the line 595. A common point between contactor of the switch 537 and the coil of the relay 7PR is connected through a capacitor 623 to a common point between the coil of the relay 7PR and the diode rectifier 621. A series of similar capacitors of varying values are all connected to the common point between the coil of the relay 7PR and the rectifier and may be connected selectively to the common point as desired. The common point between the above-mentioned contactor of the dresser feedback switch 537 and the coil of the relay 7PR is connected through a series of elements arranged in series between the said common point and the line 595; these elements are a normally-closed contactor of the relay 11CR, a normally-open contactor of the relay 11CR, a normally-closed contactor of the relay 16CR, the coil of the relay 1PR, a diode rectifier 624, and a resistor 625. The common point between the contactors of the relay 11CR is connected through a capacitor 626 to a common point between the coil of the relay 1PR and the diode rectifier 624. A series of other capacitors of different values are also connected to the last-named common point and are adapted to be connected selectively to the common point between the contactors of the relay 11CR.

The line 594 is connected to one side of a normally-open portion of the pressure switch 517 associated with the nozzle 516 in FIG. 50. The other side of this pressure switch is connected through the First Size lamp 528 to the line 595. The other side is also connected through the coil of the relay 18CR to the line 595. A normally-closed portion of the switch 517 is connected on one side to the line 594 and on the other side through a normally-open contactor of the relay 10CR and the coil of the relay 11CR to the line 595. The line 594 is connected through a normally-closed contactor of the relay 3CR and the coil of the relay 19CR, a diode rectifier 627, and a resistor 628 to the line 595. A capacitor 629 is connected from a common point between the above-mentioned normally-closed contactor of the relay 3CR and the coil of the relay 19CR to a common point between the coil and the rectifier. A series of other capacitors of different values are provided for connection selectively in the same place. One side of the normally-open air switch 514 associated with the dressing mechanism 35 is connected to the line 594, while the other side is connected through the coil of the relay 15CR to the line 595.

Figure 57:
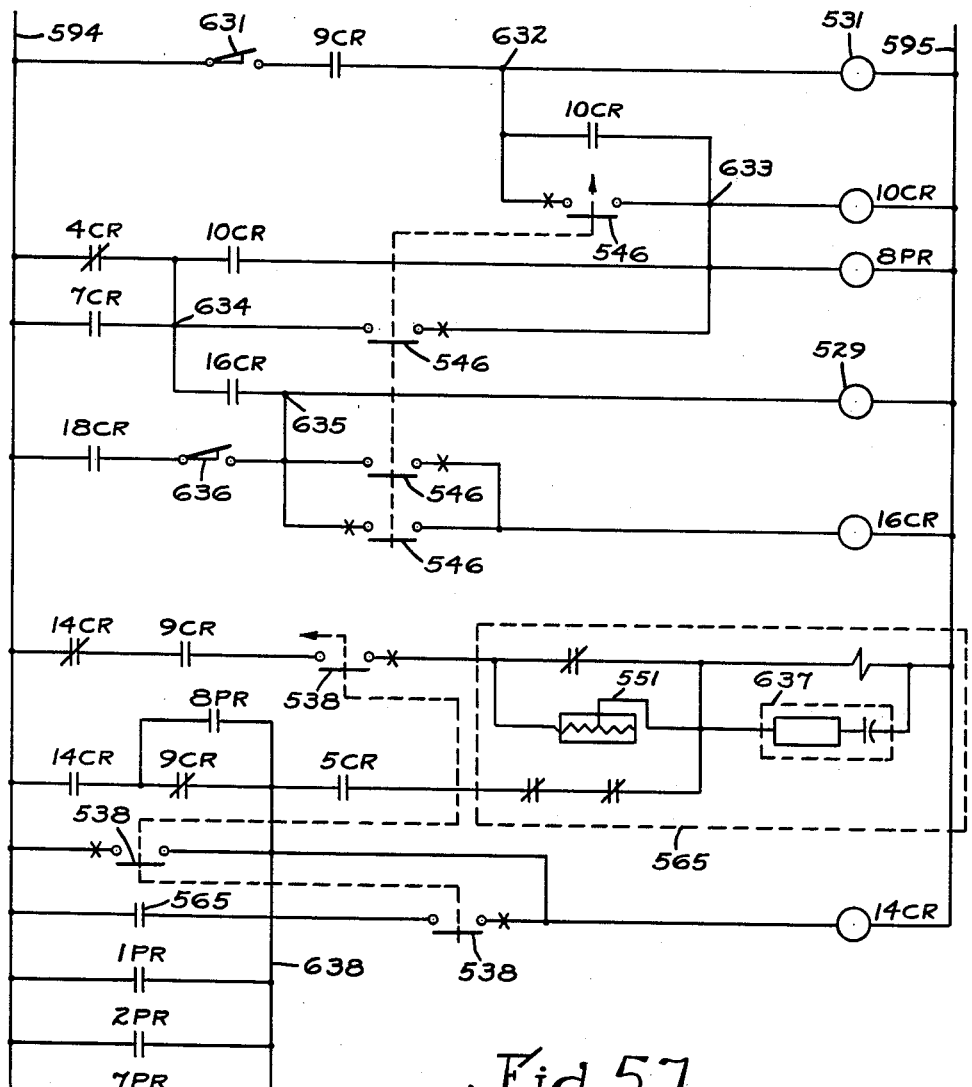

Referring to FIG. 57, the line 594 is also connected to one side of a final size gage switch 631 which is placed in closed condition when the gage 506 enters the workpiece; the other side of the switch 631 is connected through a normally-open contactor of the relay 9CR and through the Final Size lamp 531 to the line 595. A common point 632 between the aforementioned normally-open contactor of the relay 9CR and the lamp 531 is connected through a normally-open contactor of the relay 10CR to a junction 633. The junction 632 is also connected through a contactor of the selector switch 546 to the junction 633; this contactor is closed when the selector switch is in the "Gauge" position. The junction 633 is connected through the coil of the relay 10CR to the line 595. The junction 633 is also connected through the coil of the relay 8PR to the line 595. The line 594 is connected to the junction 633 through a normally-closed contactor of the relay 4CR and a normally-open contactor of the relay 10CR. The line 594 is connected through a normally-open contactor of the relay 7CR to a junction 634 which is common to the normally-closed contactor mentioned above of the relay 4CR and the normally-open contactor of the relay 10CR. The junction 634 is connected to the junction 633 through a contactor of the selector switch 546; this contactor is closed when the selector switch is in "Size" position. The junction 634 is connected through a normally-open contactor of the relay 16CR and the Finish Size Lamp 529 to the line 595. A common junction 635 between the normally-open contactor of the relay 16CR and the lamp 529 is connected back to the line 594 by a normally-open contactor of the relay 18CR and a second size switch 636 mounted below the nozzle 516 in FIG. 50. The junction 635 is connected through a contactor of the Selector switch 546 (which contactor is closed when the selector is in "Size" position) through the coil of the relay 16CR to the line 595. The junction 635 and the coil of the relay 16CR are also joined by another contactor of the selector switch 546, which contactor is in closed position when the Selector switch is in "Gauge" position.

The line 594 is connected to the line 595 by the following elements in series: a normally-closed contactor of the relay 14CR, a normally-open contactor of the relay 9CR, a contactor of the Dressing switch 538 (which contactor is closed when the switch is in "Auto" position), a normally-closed contactor of the skip dress counter 565 which is actuated by the coil of that same element. Inside the skip dress counter the work-speed adjusting knob 551 adjusts a variable resistor across the afore-mentioned normally-closed contactor, and an arc suppressor 637 is connected across the coil. A common point between the arc suppressor and the variable resistor adjusted by the knob 551 is connected back to the line 594 through two normally-closed contactors actuated by the coil of the skip dress counter and through a normally-open contactor of the relay 5CR, a normally-closed contactor of the relay 9CR, and a normally-open contactor of the relay 14CR. A normally-open contactor of the relay 8PR is connected across the afore-mentioned normally-closed contactor of the relay 9CR. The line 594 is also connected to the line 595 through a contactor of the Dressing switch 538 (which contactor is closed when the switch is in "Hand" position) and the coil of the relay 14CR. A junction 638 is connected to the common point between the normally-open contactor of the relay 5CR and the normally-closed contactor of the relay 9CR mentioned just above. This junction 638 is connected through the contactor of the Dressing switch 538 (which is closed when the switch is in "Auto" position) through the aforementioned coil of the relay 14CR to the line 595. The line 594 is connected to the junction 638 through a normally-open contactor of the skip dress counter 565, which contactor is closed when the coil of the skip dresser is not energized. The line 594 is also connected to the junction 638 through a normally-open contactor of the relay 1PR. The line 594 is also connected to the junction 638 by a normally-open contactor of the relay 2PR; they are also connected by a normally-open contactor of the relay 7PR.

*The Operation*

The operation of the apparatus will now be readily understood in view of the above description. The operator may stand in front of the machine 11 and manipulate the controls on the electrical control panel 24 and the knobs 25 and 26 while maintaining a supply of unfinished workpieces in the feed chute 19. The operation of the grinding cycle may be observed through the window 17 and by observing the lamps on the control panel. The wheelhead portion 31 reciprocates from side to side of the machine while the abrasive wheel 43 lies within the workpiece bore, this reciprocation being under the control of the oscillating mechanism 39. Movement of the wheelhead portion 31 to carry the wheel 43 across the dressing mechanism 35 may take place, on occasion, and at that time the wheelhead portion is inclined to its reciprocating axis by means of the wheelhead swinging mechanism 49. The workpiece is held in the workhead 34 which is attached to the table 33. Movement of the table 33 with the workpiece forwardly of the machine takes place under the control of the feed rate feed mechanism 53 or the controlled-force cylinder stud 148. Dressing would normally take place only after a pre-selected number of cycles have been completed (workpieces finished). Immediately after a dressing operation, the compensation mechanism 38 will move the table 33 and the secondary base 32 forward relative to the base 29 on the bearings 189 in order to compensate for the smaller wheel diameter due to the removal of wheel abrasive during the dressing operation. The specific manner in which these various elements operate will be described in the following paragraphs.

The workhead 34 provides for supporting and rotating the workpiece 91 while the abrasive action is taking place. During the grinding operation it rests on the contact edge 89 of the shoe 87 and is also engaged by the drive wheel 59 and the drive wheel 61. These wheels are rotated by the motor 56 at all times. Now, the groove 95 of the feed trough 94 is entirely full of workpieces and they fall downwardly by gravity; at times a rod with a weight at its upper end may be inserted in the groove to help them move downwardly. The loading operation takes place when the coil 488 of the loading valve 486 is energized. Pressure air is introduced behind the piston 113 through the passage 118. The piston 113 moves to the left in FIG. 7 carrying with it the link 106 which pivots the link 103 about the hinge pin 78. This carries the arm 102 and moves the feed finger 97 up the inclined surface edge 88 of the shoe 87. When the piston rod 113 is in its normal position at the right of the bore 112, the finger 97 is retracted and its forward edge is downward of the bottom opening of the groove 95, so that a workpiece rests on the edge 88. When the action described above causes the finger to move up the edge 88, the forward end of the finger 97 strikes the workpiece and carries it up the incline. The finger at the same time closes off the bottom opening of the groove 95 so that no further workpiece will emerge for the time being. The workpiece moves up the incline until it strikes the edge of the wheel 61. At that time the workpiece resides between the edge 88 and the edge of the wheel 61, and the wheel 61 is, therefore, cammed upwardly. Since the wheel 61 is mounted on the arm 77, the arm rocks about the hinge pin 78 and allows the workpiece to be moved further in the same direction. The workpiece strikes the back edge of the preceding workpiece and rolls it up over the edge of the wheel 59 into a receptacle for finished workpieces. The new workpiece falls over the edge 88 and lands in the V formed by the edge 89 of the shoe 87 and the edge of the wheel 59. This V automatically compensates for variations in the outside diameter of the workpiece in a well-known manner. When the workpiece is supported in a V which is symmetrical about a vertical line through the axis of the workpiece, variations in the outside diameter produce very small variations in the position, the wheel 61 is continually biased toward its position holding the workpiece 91 in place in the V formed between the edge 89 and the edge of the wheel 59; this bias takes place because of the springs 127 and 85. It is the nature of these springs that the spring 85 is a very strong spring, while the spring 127 is quite weak. However, the spring 127 is normally ineffective because of the pressure existing on the left side of the piston 113 because of pressure entering through the passage 118 passing through the passage 117, the bore 112, the passage 119, the bore 115, and the passage 124 to the bore 125. This pressure presses upwardly on the sleeve 126 so that it always resides in its upper position while the pressure is on. The piston cannot be moved downwardly by pressure from the contact pin 81. This means that so far as the wheel 61 is concerned, it is pressed downwardly by the strong spring 85 which has a very definite clamping action. At the same time that oil is introduced behind the piston 113 through the passage 118 air is released from the bore 125 and the sleeve 126 is free to slide up and down in the bore 125 so that the only thing that resists it is the spring 127. The wheel 61, at that time, is under the influence of the soft spring and is easily cammed upwardly by the arrival of the new workpiece. The wheel 61 is continuously driven despite the fact that it is mounted on the arm 77 because of the fact that the belt connected to the motor 56 passes over the idler pulley 72. This pulley is capable of moving and maintaining the tension in the belt at a constant value despite changes in the other pulley distances. When the new workpiece has cammed the wheel 61 upwardly, the other end of the arm 77 is lowered, so that the contact member 86 at the outer end operates the micro-switch 132, which (as is evident in FIG. 4) causes certain electrical functions to take place. The forward motion of the finger 97 can be regulated by an adjustment of the stop 114 on the end of the piston rod.

The operation of the feeding of the table 33 on which the workhead is mounted is best described in connection with FIGS. 12 through 16. In order to use the "feedrate" method of feeding, the valve 521 in FIG. 51 is placed in the position shown in the drawing (with the line 519 connected to the conduit 522), thus introducing high-pressure coolant into the passage 159 and into the enlarged bore in the block 152. This presses the table 33 forwardly (to the right in FIG. 12) and moves it relative to the abrasive wheel so that the abrasive wheel contacts and performs a grinding operation on the bore of the workpiece 91. This forward motion is resisted, however, by the feed rate mechanism 53, as will be described further hereinafter. The forward motion of the table is limited by its contact with the stop member 156 which is adjustable by means of the knob 158. When the grinding cycle is to be terminated this is indicated electrically to the coil 461 of the back-off valve 458 which causes pressure oil to be released from the passage 147 and from the back of the piston 143. The piston, therefore, moves rearwardly (to the left in FIG. 13) and the headed piston rod pulls the table 33 rearwardly so that the abrasive wheel no longer contacts the workpiece.

The feed rate mechanism 53 (shown in FIGS. 17 through 23) is operated by the electric motor 161. The front of the work table 33 presses against the cam follower 68 through the pin 171 and the cam follower engages the cam 167. Now, as the motor 161 rotates, it operates through the output shaft 163, through the torque slip clutch 164, and through the one-way clutch 165 to rotate the shaft 166 and the cam 167. The cam is shaped in a predetermined manner, but in the preferred embodiment is formed to give a constant increase of throw so that the table 33 moves forwardly under the pressure on the piston stub 148 in an even manner. When the cycle is over, air pressure appears in the passage 176 because of the energization of the coil 488 in the loading valve 486. While the new workpiece is being introduced into the workhead, therefore, the cam resets, cylinder 175 is energized and the rack 172 moves over the pinion 173, thus rotating the cam in the opposite direction. This motion does not feed back into the motor because of the one-way clutch 165. It should be noted that the torque slip clutch 164 prevents an overloading of the motor due to resistance encountered in the operation. The amount by which the cam is "unwound" or moved back (so that a position of very small throw exists next to the cam follower 168) is determined by the setting of the stop pin 178 as adjusted by means of the knob 181. As the table 33 moves forwardly, the stop member 183 eventually contacts the electrical contact shaft 184 and closes a circuit which is indicated through the electrical lead 187. This electrical contacting actuates the switch 636 which regulates the beginning of the events at the "second size." This switch is shown in FIG. 57 and schematically in FIG. 50.

The operation of the compensating mechanism 38 is best shown in connection with FIGS. 24 through 28. The compensating mechanism, of course, advances the workhead table 33 and the secondary base 32 forwardly relative to the base 29 and relative to the wheel after a dress has been completed to compensate for the smaller size of the wheel due to the removal of a portion of the wheel. This same adjustment may be made by hand by rotating the knob 199 so that a train of motion takes place through the shaft 198, the spur gear 201, the sun gear 223, the planetary gear 222, the block 224, and the shaft 203. Rotation of the shaft 223 causes the threaded shaft 192 to be threaded through the nut 191, but this motion is differentiated because of a similar engagement between the threaded shaft 192 and the sleeve 206. A very fine differential motion is, therefore, obtained. In other words, all of these compensation movements take place by rotating the threaded shaft 192 at various rates for various lengths of time. For instance, the compensating movement itself takes place when fluid is introduced into the bore 239. The compensation movement takes place due to a short rotation of the yoke 228 which operates through the one-way clutch 226 to rotate the sun gear 223 and this rotation works back through the planetary gear 222 and the block 224 to rotate the threaded shaft 192 and to cause motion of the wheelhead table and the secondary base forwardly. The reverse movement of the yoke 228 does not cause rearward feeding because of the presence of the one-way clutch 226. Now, the forward motion of the yoke 228 takes place due to motion of the piston 238 in the bore 239. Positive pressure is introduced through the passage 243 to the outboard end of the bore 239 by energization of the coil 467 of the dresser valve 465. This positive pressure presses the piston 238 to the right and rotates the yoke 228 in that manner. The electric clutch 246 is used to lock the sun gear 223 relative to the housing. This clutch is normally de-energized when ordinary compensation is taking place. At the time of a wheel change, however, it is necessary to reverse the compensation process rapidly and, for that purpose, the motor 194 is used. Because of the extremely fine movement which takes place because of the differential thread arrangement and because of the fact that the sun gear 223 is being used to produce the motions, it is necessary to get much faster action even when the motor is used. Therefore, the electric clutch is energized so that the sun gear remains fixed while motion enters the planetary system through the outer ring gear 221 and is transmitted to the shaft 192 through the planetary gear 222 to the block 224, etc. This produces a much faster movement for a given rotation of the apparatus. The rotations that take place (whether they be due to compensation or due to the returning of the tables by the energization of the motor 194) is recorded in a counter 218 through the gears and drive mechanisms which originate with the shaft 208. The amount of compensation, of course, can be adjusted by adjusting the stop 231 and the stop 232. The latter stop is adjusted by means of the adjusting knob 234 and is the normal method of adjusting the amount of compensation which takes place.

The operation of the wheelhead portion 31 is shown in connection with FIGS. 29 through 33. The wheelhead 41 may be of the high-frequency electrical motor type, or it may be the air-turbine type. Provision has been made for both of these heads in the instant machines, since the selection of head may depend on the type of work being done. The springs 258 operate through the pressure member 256 to pull the table portion rearwardly and to produce a tight connection between the forward vertical surface of the groove 252 and the forward face of the rail 248. The upper portion 259 of the wheelhead portion is carried in the forward part on the hinge pin 262 and its weight is also carried on the pad surfaces 278 in the front part of the machine and 281 at the rearward part of the machine. The springs 265 act on their pins 263 and 264 to press the upper portion 259 downwardly on the lower portion 261 to provide firm seating between the two. The upper portion 259 is rotated on occasion about the vertical axis provided by the hinge pin 262 relative to the lower portion 261. This occasion arises during the dressing operation at which time the upper portion is moved rearwardly by the introduction of oil through the conduit 273 into the bore 271. The adjusting stop screw 275 and the stop member 274 are adjusted so that, when there is no positive pressure on the piston 272, the table is inclined rearwardly because of the pressure of the spring 276. When the pressure is introduced, however, the wheelhead straightens out and its axis is parallel to the direction of the ways and of the reciprocation. In order to relieve pressure in the bore 271, therefore, during dressing (when the coil 467 of the dresser valve 465 is energized), the conduit 273 is connected to drain and the wheelhead swings so that the wheel is dressed in a conical shape with the large end of the cone outwardly of the spindle. The indicator 284 in FIG. 34 is used for adjusting the amount of swing that takes place at this time.

The operation of the cross slide switch unit 37 is shown in connection with FIGS. 34, 35, and 36. The contacts which are made as the secondary base 32 moves rearwardly relative to the base 29 take place sequentially in the switches 292, 293, and 294. These contacts are made while the motor 194 in the compensating mechanism is operating to make the large motions which are necessary when a new wheel is introduced. For instance, when the wheel has been dressed and compensated for a considerable period, the point is reached at which the wheel is worn. The adjustable finger 298 is, therefore, set for this position. When the new wheel is put on, the motor in the compensation unit moves the secondary base 32 and the table 33 backwardly as a unit until the green wheel position which is set on the the contact member 296 is indicated by the switch 293. With a green wheel a considerable amount of dressing must take place, so the new and dressed switch 294 indicates where a position is reached when normal dressing and compensation can take place.

The oscillating mechanism 39, whose operation is best understood with reference to FIGS. 37 through 40 operates continuously during the time that the machine is operating. The motor 46 drives the unit through a flexible belt. Rotation of the shaft 326 causes a similar rotation of the cam 332 and the flow indicated by the adjustment between the inner member 333 and the outer member 334 causes pressure against the roller 341 which carries the wheelhead unit back and forth. The roller 341 is mounted in a floating position on the frame 340 which has the pins 343 and 344 extending therefrom and slidable in the bores 345 and 346 in the bar 308 of the wheelhead portion. However, this sliding motion does not take place because of the connection of the frame 340 to the piston 337. The movement of this piston in its bore 336 in the cylinder 335 with viscous damping takes place. As the piston moves to the right in the bore, for instance, oil is forced from that end of the bore through the space between the bore 349 and the stem 354 and through the passage 356 to the rear of the piston. As the piston advances, the tapered form of the stem 354 causes the space to be more and more restricted so that the movement is more strenuously resisted. The diaphragm 353 expanding into the counterbore 352 eases the situation and introduces a spring effect into the movement. In the other direction (because of the check valve 358) oil readily passes through the passage 357 from the left side of the piston to the right side. The spring 355 tends to maintain the piston in its left hand position and the net effect is that the frame 340 and the bar 308 are locked together except for the ability of the connection to absorb extraneous vibrations. While the cam is causing the wheelhead portion to reciprocate, the piston 312 is sliding back and forth in the bore 311. At the proper time in the cycle, however, it is desired to retract the wheel and this is done by introducing pressure oil through the passage 324 at the piston rod side of the piston. As the piston moves to the right in FIG. 39, the oil passes outwardly through the passage 324, through the throttle 431, through the conduit 432, through the valve 434 and through the table direction valve 447 to exhaust. When the piston reaches the right side of the bore, the plug 321 strikes the pin 323 and the plug is driven into the counterbore 319. The further it goes into the counterbore the less the oil is able to flow past the plug into the hole in the area of the spring 322. This causes a gradually-increasing resistance to movement and eventually the piston stops.

Figure 48:
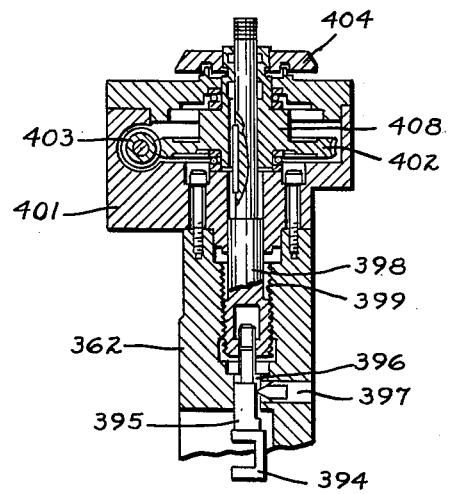
FIG. 48 is a sectional view of the apparatus taken along the line XLVIII—XLVIII of FIG. 46.

The operation of the dressing mechanism 35 is shown in FIGS. 41 through 49. The spring 381 keeps the piston 378 normally to the right in the bore 375. In this condition, the arm 365 is raised and the diamond is away from the line of the wheel area. However, when pressure air is introduced through the conduit 380, the piston 374 moves to the left and lowers the diamond for a dressing operation. The attachment of the air gauge 514 to the passage 387 assures an interlock in the control of the machine so that the cycle continues only when the diamond is in raised position and out of the way of the wheel. The dressing mechanism is arranged for self-compensation for thermal drift. As the machine becomes heated during the working day, it is quite often found that the relationship of the parts will change; in the present case, any change in the size of the bore being ground due to this thermal drift is corrected by the motor 406. The motor drives through the worm and gearing to rotate the vertical shaft 398 which, as is evident in FIG. 48, is threadedly engaged with the threaded bore 399. This causes the vertical shaft 395 to move vertically and to carry the knob 393 at the outer end of the lever 388 in the same direction. This movement causes the extension 391 to press against the metal insert 392 on the base of the dresser and causes the body 362 to move forwardly, thus advancing the diamond. Since it will be possible for the motor 406 to entirely screw the shaft 398 out of its fitting in the threaded bore 399, a provision is made to prevent this. The star wheel 413 is rotated by the detent finger 411 as the finger rotates with the worm gear 402. After the finger has engaged successive notches in the star wheel 413, eventually the large unnotched portion 414 of the star wheel will arrive opposite the detent finger. Then, when the gear and the finger try to pass this enlarged portion, they encounter considerable resistance. This stalls the motor 406 so that no damage is done by the threaded engagement progressing beyond a predetermined limit.

Referring to FIG. 50, which shows the hydraulic and pneumatic arrangement, it can be seen that the loading of a workpiece into the workhead takes place by providing the passage 118 of the loading cylinder 113 with pressure oil. In order to do this the loading valve 486 must be in the right hand position, the coil 488 being energized. This permits air to pass from the air source 475 through the filter 479, through the pressure regulating valve 483, through the mist lubricant generator 484, through the conduit 485, through the conduit 489, through the passage 493, and through the conduit 495 to the cylinder. At the same time, air passes out of the cylinder through the passage 123, the conduit 494, the passage 492 of the valve 486, and out to exhaust through the port 491. At this same point in the cycle, compensation is taking place. This means that pressure oil is introduced through the passage 243 of the compensation cylinder 439. This positive pressure reaches the compensation cylinder from the junction 421, through the port 464 of the dresser valve 465, and, because the coil 467 is energized, the spool 466 is to the right. This positive pressure leaves the port 471 and passes through the conduit 473 to the compensation cylinder. The oil at the other side of the piston 238 is forced through the port 244 and to exhaust by passing through the conduit 446, the port 451 of the table direction valve 447, and through the port 453 (since the coil 449 is not energized), so that the spool 443 is in the left hand position and so that the ports 451 and 453 are in communication. At this same time in the cycle, as has been stated, the coil 467 of the dresser valve 465 is in the energized condition so that the spool 466 is to the right and positive pressure passes through the conduit 479 to the dresser cylinder. This presses the piston 374 to the left against the spring pressure and causes the diamond to move down into position; as the wheel traverses, the diamond will dress the wheel. At this same time in the cycle, in order that the table may carry the wheel out of the work area and past the dresser, the table speed valve 434 is in the left position under energization of the coil 436. At the same time, the table direction valve 447 has its coil 449 de-energized so that the spool is in the left position. Furthermore, the back-off valve 458 has its coil 461 de-energized so that its spool is in the left position, thus causing pressure oil to appear at the passage 147 of the piston 143. This allows the table 33 to move forwardly under the impetus of the pressure coolant in the conduit 522. In order to initiate the movement of the wheel in the return direction, the table direction valve 447 has its spool moved to the right, the coil 449 being energized. In order that the diamond cannot pass over the wheel again, the dresser valve 467 has its spool moved to the left; that is to say, its coil 467 is de-energized so that the diamond is moved up out of the way. The movement of the dresser valve in this way also cuts off the oil to the compensation cylinder and connects its lines to exhaust so that the compensation cylinder retracts in preparation for another compensation movement stroke. Incidentally, as the spring moves the piston 374 of the dresser cylinder back again, the piston 378 covers the nozzle 387 and indicates to the air switch 514 that the diamond is out of the way. In the electrical system this acts as an interlock and permits the cycle to continue. While the wheel is moving axially toward the workpiece, the back-off valve 558 has its spools still in the left position, since feed is not to take place yet. The loading valve has its spool to the right and loading is still going on but will be completed before the wheel reaches the work area. The next portion of the cycle takes place while the workpiece 33 is moving forwardly so that the wheel approaches the surface to be finished. The most important change during this part of the cycle is that the back-off valve 458 has its spool moved to the right, thus connecting the pressure side of the piston 143 to exhaust, so that the table is free to move. The table does move under the impetus of the coolant in the line 522. If "feed-rate" feeding is taking place, the condition will be that shown in FIG. 50 in which the pump 518 is directly connected and presents a high pressure coolant to the stud 148. The table speed valve 438 has its spool located at the right in order that the dress speed throttle 26 will be by-passed and the speed reciprocation of the wheelhead will be determined by the setting of the hand throttle 431. The loading valve 486 is now definitely conditioned with its spool in the left position so that pressure air appears to the left side of the piston 113 and pulls the loading finger back ready for another workpiece at the proper time.

During the first portion of the actual grinding cycle a coarse feed is used, as determined by the setting of the Coarse Feed dial 552. This setting determines the rate at which the motor 53 rotates the cam, so that the surface of the cam falls away from the workhead table 33 and allows it to advance under the impetus of pressure at the stud 148. As soon as the "first size" has been reached, as indicated by the nozzle 516 to the air switch 517, the machine switches to "fine feed," which means that the motor 53 rotates at a slower rate and causes the cam to fall away from the front of the workhead table at a slower rate. All of the hydraulic valving remains the same during these portions of the cycle. Finally, the "sparkout" portion of the cycle is reached and continues. However, at the beginning of the fine feed (at the first size) the gauge retraction valve 498 has its coil 501 energized to move its spool to the right to permit air to escape from the gauge retraction cylinder 505 so that the gauge 506 tries to enter the workpiece. It continues to do so through the sparkout portion of the cycle and, as soon as it enters, it closes the switch 631 and the cycle is terminated. At that time the wheel moves out of the workpiece on an extended traverse which may also be used for dressing, although when the skip-dressing system is used, the skip-dress counter 565 permits actual dressing to take place only after a certain number of cycles.

It should be noted that the nozzle 511 indicates to the air switch 512 that the gauge 506 is retracted. This switch 512 is located in the electric circuitry to indicate to the loading mechanism that the gauge is not in the way; it is a safety interlock which assures freedom from accident.

In order to use the "controlled-force" system of grinding, it is only necessary to turn the valve 521 so that it connects the conduit 525 to the conduit 522. The relief valve 524 is adjusted so that the coolant pressure in the line 525 is much less than that which originates in the pump 518. This low-pressure coolant is furnished to the passage 151 of plug 148 and presses the workhead slide forward. At that time the motor 53 is not energized to rotate the cam; furthermore, the cam reset cylinder does not return the cam at the end of every cycle. This means that a high point is not directed toward the table to hold it away from the forward part of the machine. As a matter of fact, the cam is locked in a position where its area of minimum throw is directed toward the workhead table so that it does not contact the table at all during the grinding cycle. It should be noted that, while the dresser valve 465 has its coil 467 energized so that the spool 466 is in the right position (thus furnishing pressure to the dresser cylinder in the compensation cylinder), the bore 271 of the workhead swiveling mechanism 49 is connected through the line 472 to exhaust. This means that the workhead portion swings at a slight angle to the direction of reciprocation. When the wheelhead causes the wheel to move past the diamond (which is now in its down position), the wheel is dressed with a conical shape with the large portion of the cone at the outboard end of the spindle. When the dresser is returned to its normal position and the spool is to the left, pressure appears on the line 472 and causes the wheelhead portion to straighten out so that the undeflected spindle is exactly parallel to the direction of reciprocation. The amount of cone with which the wheel is dressed is selected to exactly compensate for the amount of deflection of the spindle which will take place. This is particularly important when the controlled-force system of feeding is used, since it is evident that the controlled-force system will cause the spindle to be bent exactly the same amount during most of the grinding cycle. If the size of the cone is selected properly, the generating line of the cone, where it touches the workpiece, will be exactly parallel to the direction of reciprocation so that the bore will be ground perfectly straight. Even when the feed-rate system is used, the cone can be selected so that it compensates for deflection of the spindle during the part of the grinding cycle where the greatest force exists and the greatest spindle deflection takes place.

The inter-relationship of the electrical circuitry with the elements described above will be evident from the description of the connections. However, there are some operative features that are interesting to note. For instance, the spark-out timer 541 in FIG. 53 starts its time by the closure of a normally-open contactor of the relay 16CR; the coil of the relay 16CR in FIG. 57 is energized when the "second size" switch 636 (see FIG. 50) is closed. Before the second size switch 636, however, is effectual to energize the coil of the relay 16CR, the normally-open contactor of the relay 18CR adjacent it must be closed; the coil of the relay 18CR was energized by the closure of the switch 517 which is the air-pressure switch associated with the nozzle 516 which, in turn, is mounted adjacent the front of the workhead (see FIG. 50). Before the relay 16CR can be energized, however, the selector switch 546 had to be set on either "Gauge" or "Size." Its position in the "Off" location will prevent the relay from closing.

Figure 52:
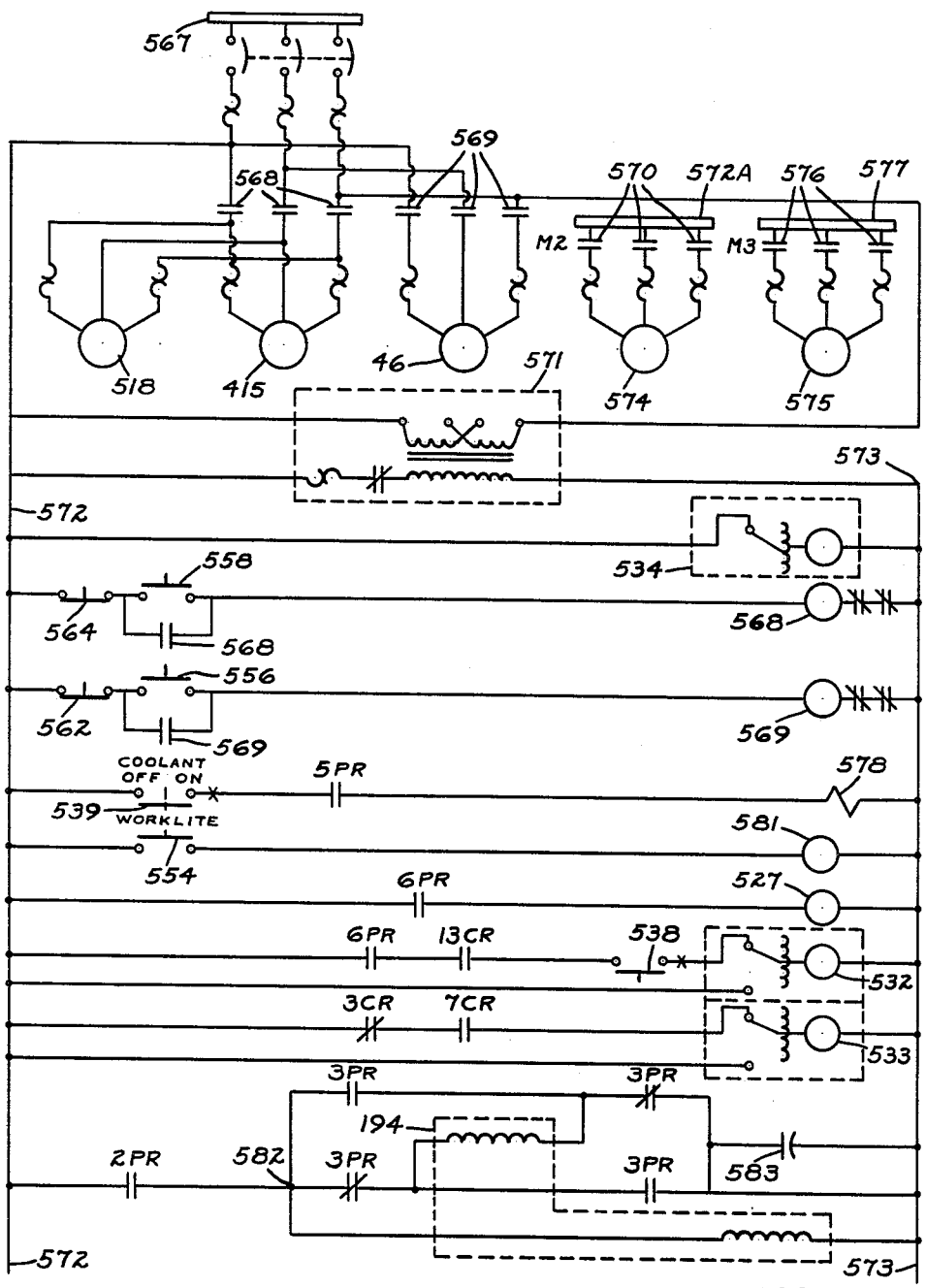
FIGS. 52 through 57 are schematic views showing the electrical circuitry of the apparatus.

Referring to FIG. 52, it is interesting to note that the compensation motor 194 is reversible and that, as is evident from the drawing, the direction in which the motor turns depends on the setting of the relay 3PR. If the relay is energized, the motor will go in one direction, because the normally-open contactors will be closed and the normally-closed contactors will be open. The motor does not rotate, however, even in those conditions until the normally-open contactor of the relay 2PR is closed. The coil 2PR is energized when the Work Slide switch 548 is either in the "Rear" or "Forward" position. The relay 2PR is also energized (as is evident at the top of FIG. 54), when the interlock switch 549 is in "On" position and the normally-open contactor of the relay 12CR is closed (this occurs when the green wheel switch 293 is closed).

At the bottom of FIG. 53, in connection with the feed rate motor 161, the feed rate control 552 and 553 provide the motor with a proper 27-volt signal from the binding posts 4 and 5. As is evident, this will take place when the normally-open contactors of the relays 9CR and 16CR are closed by energization of those relays. The coil of the relay 9CR (at the bottom of FIG. 55) is energized when the switch 616 associated with the front of the wheelhead portion is energized, indicating that the wheel is in the bore. The relay 16CR can be energized to reverse the polarity of the energization of the motor 161, first of all, by the selector switch 546 either being on the "Gauge" or the "Size" position. When the "second size" switch 636 is closed, the relay 16CR is energized and the normally-closed contactor is open, thus reversing the motor 161.

At the middle of FIG. 53, it should be noted that the relay 7PR and the relay 1PR can, by being energized, cause the dresser motor 406 to bring about a compensation of the diamond. These relays are energized, however, only during a small portion of the cycle, and the timing of their energization takes place by the discharge of current from their respective capacitors (capacitor 623 in the case of relay 7PR—top of FIG. 56—and capacitor 626 in the case of relay 1PR). With the dresser switch 536 in "Auto" position, both of the contactors of the switch 536 in series with the windings of the dresser motor in FIG. 53 are closed. This means that, if either of the normally-closed contactors of the relay 7PR or 1PR happened to be closed when the normally-open contactor of the relay 8PR that is in line with them is closed, then the dresser motor will be energized. Relay 8PR can be energized, for instance, when the switch 631 (which is the final size switch) on the gauge closes. When this happens, if the normally-open contactors happened to be closed, the dresser motor 406 will make a compensation, thus indicating that it took too long or too short a time to finish the workpiece and indicating that the machine had drifted.

At the bottom of FIG. 54 it can be seen that the switch 599, which is closed when the wheel has finished its dress, energizes the coil of the relay 2CR which enters into many portions of the circuit including the energization of the table valve coil 467 through determining the energization of the coil of the relay 13CR. The closure of the switch 599 also brings about the energization of the load valve 488, if other events occur at the same time; particularly, if either the Load switch 536 is closed or the normally-open contactor of the relay 11CR is closed. The relay 11CR (at the bottom of FIG. 56) is interlocked with the pressure switch 517 which tells whether "first size" has been reached and it also depends on whether the relay 10CR is energized or not, the relay 10CR requiring the closure of the "final size" switch 631. In other words, loading cannot take place until the workpiece is finished.

As is evident at the bottom of FIG. 55, the closure of the Inner Dress switch 615 causes the energization of the coil of the relay 8CR. The contactors of this relay operate in various ways throughout the circuit. For instance, the relay 8CR enters into the energization of the coil of the relay 4CR (FIG. 55) and also appears in the circuitry for actuating the coil 467 of the table valve.

The switch 616, which is actuated by a dog in the front of the wheelhead portion, also enters into a number of circuits in the apparatus. Among other things, it enters directly into the actuation of the cross slide valve coil 461 of the back-off valve 458. Since the switch 616 indicates that the wheel is in the bore of the workpiece, we would not want the cross-slide valve coil 461 to be energized unless it served to release the pressure on the back of the piston 143 which locks the workhead table 33. An examination of FIG. 50 indicates, however, that the energization of the coil 461 carries the spool 459 to the right, and causes pressure fluid to appear behind the piston 143 thus releasing the table, which is the desired situation. The switch 616 also directly causes the energization of the relay 9CR and the relay 5PR. Among other things, the energization of the relay 9CR closes its normally-open contactor which works with the final size switch 631 at the top of FIG. 57. When both of these are closed at the end of the cycle, the lamp 531 lights up, showing that "final size" has been reached and the coil of relay 10CR is energized as well as the relay 8PR. The energization of the relay 5PR acts to energize the coolant valve coil 578, as is evident near the middle of FIG. 52, when the normally-open contactor of the relay 5PR closes. It should be noted that the energization of the relay 9CR by the "gauge in-the-hole" switch 616 operates at the bottom of FIG. 55 to operate the skip-dress counter 565 by the energization of the coil of the relay 9CR.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative reciprocatory movement between the wheelhead and the workhead in the direction of the axis of the surface of revolution, a second means bringing about relative movement between the wheelhead and the workhead transversely of the axis of the surface of revolution, means for dressing the abrasive wheel to give it a surface of revolution whose generatrices lie at a substantial angle to the generatrices of the surface of revolution of the workpiece, the dressed wheel surface compensating for the spindle deflection during grinding, so that the surface elements of the wheel surface in the area of grinding are substantially parallel to the axis of the surface of revolution, means for bringing about movement of the wheel past the dressing means in the direction of the said axis, and means for inclining the spindle to the said axis during the dressing movement and returning it to a position during the grinding operation in which it would be parallel to the said axis in the absence of spindle deflection.

2. A grinding machine for finishing a surface of revolution, comprising a base, a workhead mounted on the base for supporting and rotating a workpiece, a wheelhead also mounted on the base for supporting and rotating a spindle with an abrasive wheel at its outer end, means bringing about relative horizontal movement between the wheelhead and the workhead in a direction of feed, transversely of the axis of the surface of revolution, the workhead comprising a member having a moving surface and a shoe having an unmoving contact surface, the moving surface of the member and the said contact surface of the shoe defining a V which is symmetrical about a line normal to the direction of feed.

3. A grinding machine for finishing a surface of revolution, comprising a base, a workhead mounted on the base for supporting and rotating a workpiece, a wheelhead also mounted on the base for supporting and rotating a spindle with an abrasive wheel at its outer end, means bringing about relative horizontal movement between the wheelhead and the workhead transversely of the axis of the surface of revolution, the workhead comprising a first shoe and a second shoe having a generally flat contact surface, the two shoes defining a V symmetrical about a vertical line, the second shoe having a loading finger which is movable along a line generally perpendicular to its contact surface from the operative position to an inoperative position, and feed means introducing a workpiece into the path of the finger when it is away from the operative position.

4. A grinding machine for finishing a surface of revolution, comprising a base, a workhead mounted on the base for supporting and rotating a workpiece, a wheelhead also mounted on the base for supporting and rotating a spindle with an abrasive wheel at its outer end, means bringing about relative horizontal movement between the wheelhead and the workhead transversely of the axis of the surface of revolution, the workhead comprising a rotating disk and a shoe having a generally flat contact surface, the edge of the disk and the contact surface of the shoe defining a V symmetrical about a vertical line, the shoe having a loading finger which is movable along a line generally perpendicular to its contact surface from the operative position to an inoperative position, feed means introducing a workpiece into the path of the finger when it is away from the operative position, and a second rotating disk resiliently loaded to press against the upper portion of the workpiece when it is in position in contact with the first disk and the shoe.

5. A grinding machine for finishing a surface of revolution on a workpiece by abrasion, comprising a base, a workhead mounted on the base for supporting and rotating a workpiece, a wheelhead also mounted on the base for supporting and rotating a spindle with an abrasive wheel mounted thereon, a table on which the workhead is fastened, means providing for sliding movement of the table relative to the base in a direction transverse of the axis of the surface of revolution, means pressing the table to cause the said movement of the table to bring the said surface and the wheel together for the grinding operation, and a feed mechanism for resisting the said movement of the table caused by the pressing means, the feed mechanism consisting of a formed surface movable to permit the said movement of the table to take place in a pre-determined manner.

6. A grinding machine for finishing a surface of revolution on a workpiece by abrasion, comprising a base, a workhead mounted on the base for supporting and rotating a workpiece, a wheelhead also mounted on the base for supporting and rotating a spindle with an abrasive wheel mounted thereon, a table on which the workhead is fastened, means providing for sliding movement of the table relative to the base in a direction transverse of the axis of the surface of revolution, means pressing the table to cause the said movement of the table to bring the said surface and the wheel together for the grinding operation, a feed mechanism for resisting the said movement of the table caused by the pressing means, the feed mechanism consisting of a rotatable cam permitting the said movement of the table to take place in a pre-determined manner, a motor for rotating the cam to permit the said table movement, a retraction means independent of the motor to rotate the cam in the opposite direction, and means independent of the cam for moving the table rapidly in the opposite direction.

7. A grinding machine for finishing a surface of revolution on a workpiece by abrasion, comprising a base, a workhead mounted on the base for supporting and rotating the workpiece, supporting means mounted on the workhead and providing at least two points of contact with the workpiece, a pressure member for contact with the workpiece at a point opposed to the above-mentioned points of contact, a light pressure resilient means biasing the pressure member toward a position of contact with the workpiece, means introducing the workpiece between the supporting means and the pressure member to move the pressure member against the action of the resilient means until the workpiece is in place in contact with the supporting means, and clamping means including a high pressure resilient means locking the pressure member in place against the workpiece only when the latter is in place in contact with the supporting means.

8. A grinding machine for finishing a surface of revolution on a workpiece by abrasion, comprising a base, a workhead mounted on the base for supporting and rotating the workpiece, supporting means mounted on the workhead and providing at least two points of contact with the workpiece, a pressure member in the form of a rotating disk for contact with the workpiece at a point opposed to the above-mentioned points of contact, a strong spring and a weak spring in series biasing the pressure member toward a position of contact with the workpiece, means introducing the workpiece between the supporting means and the pressure member to move the pressure member against the action of both springs until the workpiece is in place in contact with the supporting means, and means locking the weak spring so that it is ineffective when the member is against the workpiece and the latter is in contact with the supporting means.

9. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, a table slidable on the base for bringing about relative movement between the wheelhead and the workhead transversely of the said axis, means pressing the table to cause the movement of the table to bring the said surface and the wheel together for the grinding operation, a feed mechanism for restricting to predetermined amounts the said movement of the table caused by the pressing means to bring about feed-rate grinding, and means operable on occasion to render the said feed mechanism inoperative so that the table movement is restricted only by the spring in the spindle and controlled-force grinding takes place.

10. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, a table slidable on the base for bringing about relative movement between the wheelhead and the workhead transversely of the said axis, a cylinder and piston extending between the table and base in the direction of relative movement, a regulated-pressure source of fluid connected to the cylinder and piston to cause the movement of the table to bring the said surface and the wheel together for the grinding operation, a feed mechanism for restricting to predetermined amounts the said movement of the table caused by the said cylinder and piston to bring about feed-rate grinding, means operable on occasion to render the said feed mechanism inoperative so that the table movement is restricted only by the spring in the spindle and controlled-force grinding takes place, and means for causing the said source to pass high-pressure fluid to the cylinder and piston during feed-rate grinding and to pass low-pressure fluid during controlled-force grinding.

11. A grinding machine for finishing a surface of revolution on a workpiece by abrasion, comprising a base, a workhead mounted on the base for supporting and rotating the workpiece about the axis of the surface of revolution, a wheelhead portion consisting of a lower part mounted on the base for sliding movement in the direction of the said axis and an upper part adapted to support and rotate a spindle with an abrasive wheel at its outer end, the upper part and the lower part being pivotally connected for relative swinging movement about a vertical axis to a dressing position against a stop, and an actuator joining the upper and lower parts for bringing about the said swinging movement on occasion and returning the upper part to a grinding position against a stop.

12. A grinding machine for finishing a surface of revolution on a workpiece by abrasion, comprising a base, a workhead mounted on the base for supporting and rotating the workpiece about the axis of the surface of revolution, a wheelhead portion consisting of a lower part mounted on the base for sliding movement in the direction of the said axis and an upper part adapted to support and rotate a spindle with an abrasive wheel at its outer end, a dressing mechanism mounted on the base, the upper part and the lower part being pivotally connected for relative swinging movement about a vertical axis, and piston and cylinder joining the upper and lower parts for bringing about the said swinging movement from a first position wherein the undeflected spindle is parallel to the said axis to a second position wherein the undeflected spindle is at a predetermined angle to the axis for passage of the wheel by the dressing mechanism to form a conical surface on the wheel.

13. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, means bringing about relative movement between the wheelhead and the workhead in the direction of the said axis, the said means consisting of a rotatable cam pressing against the wheel head to bring about short oscillations of the wheelhead and a cylinder and piston for bringing about on occasion a relatively long movement of the wheelhead, the cylinder and piston being connected between the wheelhead and the base with the cylinder and piston being each rigidly fixed to one of the wheelhead and base and providing for guiding and control during the short oscillations, and a vibration-absorbing mechanism connected to control the transmittal of oscillations from the cam to the wheelhead.

14. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, means bringing about relative movement between the wheelhead and the workhead in the direction of the axis of the surface of revolution, a dressing mechanism located beside the path of the said movement, the mechanism having a dressing tool mounted for swinging movement from a first position adjacent the path to a second position away from the said path, a cylinder and piston connected to the tool for bringing about the said swinging movement, means separate from the swinging movement for advancing the dressing tool toward the said path, the last-named means including a motor operating through a screw mechanism to move one end of a lever which ultimately causes the advancing of the dressing tool.

15. A grinding machine for finishing a surface of revolution on a workpiece by abrasion, comprising a base, a workhead for supporting and rotating the workpiece about the axis of the surface of revolution, a wheelhead for supporting and rotating a spindle with an abrasive wheel mounted thereon, a feed mechanism for bringing about a predetermined relative movement between the wheelhead and the workhead transversely of the said axis, a dressing mechanism, a compensating mechanism for bringing about an additional such transverse movement on occasion, the compensating mechanism being capable of bringing about the said additional movement selectively at a slow speed or at a relatively high speed, the compensating mechanism including a screw-and-nut arrangement whose rotation causes the said additional transverse movement, a motor driving the said arrangement through a gear arrangement which includes a ring gear, a planetary gear and a sun gear, the planetary gear being directly connected to the screw-and-nut arrangement, the motor being connected to the ring gear for rapid movement, and a piston and cylinder operative to make small incremental movements at slow speed through the sun gear, and a clutch operative to lock the sun gear against rotation except when the said incremental movements are taking place.

16. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, the workhead comprising a rotating disc and a shoe having a generally flat contact surface, the edge of the disc and the said contact surface of the shoe defining a V which is symmetrical about a vertical line.

17. A grinding machine for finishing a surface revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means for bringing about relative movement between the wheelhead and the workhead in the direction of the axis of the surface of revolution, a second means for bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, a table on which the workhead is fastened, means providing for sliding movement of the table relative to the base in a direction transverse of the axis of the surface of revolution, means pressing the table to cause the said movement of the table to bring the said surface and the wheel together for the grinding operation, and a feed mechanism for resisting the said movement of the table caused by the pressing means, the feed mechanism consisting of a formed surface movable to permit the said movement of the table to take place in a predetermined manner.

18. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means for bringing about relative movement between the wheelhead and the workhead in the direction of the axis of the surface of revolution, a second means for bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, a table slidable on the base for bringing about relative movement between the wheelhead and the workhead transversely of the said axis, means pressing the table to cause the movement of the table to bring the said surface and the wheel together for the grinding operation, a feed mechanism for restricting to predetermined amounts the said movement of the table caused by the pressing means to bring about feed-rate grinding, and means operable on occasion to render the said feed mechanism inoperative so that the table movement is restricted only by the spring in the spindle and controlled-force grinding takes place.

19. A grinding machine for finishing the surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means for bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface with the larger end of the conical surface located outwardly of the spindle, the conical surface compensating for the spindle deflection during grinding, so that the surface elements of the wheel surface in the area of grinding are substantially parallel to the axis of the surface of revolution, the wheelhead consisting of a lower part mounted on the base for sliding movement in the direction of the said axis and an upper part adapted to support and rotate the spindle with the abrasive wheel at its outer end, the upper part and the lower part being pivotally connected for relative swinging movement about a vertical axis, and an actuator joining the upper and lower parts for bringing about the said swinging movement on occasion.

20. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, a compensating mechanism for bringing about an additional transverse movement on occasion, the compensating mechanism being capable of bringing about the said additional movement selectively at a slow speed or at a relatively high speed.

21. A grinding machine for finishing a surface of revolution, comprising a base, a workhead mounted on the base for supporting and rotating a workpiece, a wheelhead also mounted on the base for supporting and rotating a spindle with an abrasive wheel at its outer end, means bringing about relative horizontal movement between the wheelhead and the workhead transversely of the axis of the surface of revolution, the workhead comprising a rotating disc and a shoe having a generally flat contact surface, the edge of the disc and the said contact surface of the shoe defining a V which is symmetrical about a vertical line, a pressure member for contact with the workpiece at a point opposed to the points of contact thereof with the said disc and shoe, resilient means biasing the pressure member toward a position of contact with the workpiece, means introducing the workpiece between the shoe and the pressure member to move the pressure member against the action of the resilient means until the workpiece is in place in contact with the shoe and disc, and clamping means locking the pressure member in place against the workpiece only when the latter is in place in contact with the said disc and shoe.

22. A grinding machine for finishing a surface of revolution on a workpiece by abrasion, comprising a base, a workhead mounted on the base for supporting and rotating a workpiece, a wheelhead also mounted on the base for supporting and rotating a spindle with an abrasive wheel mounted thereon, a table on which the workhead is fastened, means providing for sliding movement of the table relative to the base in a direction transversely of the axis of the surface of revolution, means pressing the table to cause the said movement of the table to bring the said surface and the wheel together for the grinding operation, and a feed mechanism for resisting the said movement of the table caused by the pressing means, the feed mechanism consisting of a formed surface movable to permit the said movement of the table to take place in a predetermined manner, the feed mechanism restricting to predetermined amounts the said movement of the table caused by the pressing means to bring about feed-rate grinding, and means operable on occasion to render the said feed mechanism inoperative so that the table movement is restricted only by the spring in the spindle and controlled-force grinding takes place.

23. A grinding machine for finishing a surface of revolution on a workpiece by abrasion, comprising a base, a workhead mounted on the base for supporting and rotating a workpiece, a wheelhead also mounted on the base for supporting and rotating a spindle with an abrasive wheel mounted thereon, a table on which workhead is fastened, means providing for sliding movement of the table relative to the base in a direction transverse of the axis of the surface of revolution, means pressing the table to cause the said movement of the table to bring the said surface and the wheel together for the grinding operation, and a feed mechanism for resisting the said movement of the table caused by the pressing means, the feed mechanism consisting of a formed surface movable to permit the said movement of the table to take place in a predetermined manner, a compensating mechanism for bringing about an additional such transverse movement on occasion, the compensating mechanism being capable of bringing about the said additional movement selectively at a slow speed or at a relatively high speed.

24. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, a table slidable on the base for bringing about relative movement between the wheelhead and the workhead transversely of the said axis, means pressing the table to cause the movement of the table to bring the said surface and the wheel together for the grinding operation, a feed mechanism for restricting to predetermined amounts the said movement of the table caused by the pressing means to bring about feed-rate grinding, and means operable on occasion to render the said feed mechanism inoperative so that the table movement is restricted only by the spring in the spindle and controlled-force grinding takes place, the wheelhead consisting of a lower part mounted on the base for sliding movement in the direction of the said axis and an upper part adapted to support and rotate the spindle with the abrasive wheel at its outer end, the upper part and the lower part being pivotally connected for relative swinging movement about a vertical axis, and an actuator joining the upper and lower parts for bringing about the said swinging movement on occasion.

25. A grinding machine for finishing a surface of revolution on a workpiece by abrasion, comprising a base, a workhead mounted on the base for supporting and rotating the workpiece about the axis of the surface of revolution, a wheelhead portion consisting of a lower part mounted on the base for sliding movement in the direction of the said axis and an upper part adapted to support and rotate a spindle with an abrasive wheel at its outer end, the abrasive wheel having a conical surface with the larger end outwardly of the spindle, the upper part and the lower part being pivotally connected for relative swinging movement about a vertical axis, and an actuator joining the upper and lower parts for bringing about the said swinging movement on occasion, means bringing about relative movement between the wheelhead and the workhead in the direction of the said axis, the last-named means consisting of a rotatable means pressing against the wheelhead to bring about short oscillations thereof and an actuator for bringing about on occasion a relatively long movement.

26. A grinding machine for finishing a surface of revolution on a workpiece by abrasion, comprising a base, a workhead mounted on the base for supporting and rotating the workpiece about the axis of the surface of revolution, a wheelhead portion consisting of a lower part mounted on the base for sliding movement in the direction of the said axis and an upper part adapted to support and rotate a spindle with an abrasive wheel at its outer end, the abrasive wheel having a conical surface with the larger end outwardly of the spindle, the upper part and the lower part being pivotally connected for relative swinging movement about a vertical axis, and an actuator joining the upper and lower parts for bringing about the said swinging movement on occasion, means bringing about relative movement between the wheelhead and the workhead in the direction of the axis of the surface of revolution, a dressing mechanism located beside the path of the said movement, the mechanism having a dressing tool mounted for swinging movement from a first position adjacent the path to a second position away from the said path, and means separate from the swinging movement for advancing the dressing tool toward the said path.

27. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a spindle with an abrasive wheel mounted thereon, the abrasive wheel having a conical surface with the larger end outwardly of the spindle, means bringing about relative movement between the wheelhead and the workhead in the direction of the axis of the surface of revolution, a dressing mechanism located beside the path of the said movement, the mechanism having a dressing tool mounted for swinging movement from a first position adjacent the path to a second position away from the said path, means separate from the swinging movement for advancing the dressing tool toward the said path, and a compensating mechanism for bringing about an additional such transverse relative movement between the wheelhead and workhead on occasion, the compensating mechanism being capable of bringing about the said additional movement selectively at a slow speed or at a relatively high speed.

28. A grinding machine for finishing a surface of revolution on a workpiece by abrasion, comprising a base, a wheelhead mounted on the base for supporting and rotating the workpiece about the axis of the surface of revolution, a wheelhead also mounted on the base for supporting and rotating a cantilever spindle with an abrasive wheel at its outer end, the first means bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface, the conical surface compensating for the spindle deflection during grinding so that the surface elements of the wheel surface in the area of grinding are substantially parallel to the axis of the surface of revolution, the workhead comprising a rotating disc and a shoe having a relatively flat contact surface, the edge of the disc and the said contact surface of the shoe defining a V which is symmetrical about a vertical line, a table on which the workhead is fastened, means providing for sliding movement of the table relative to the base in a direction transverse of the axis of the surface of revolution, means pressing the table to cause the said movement of the table to bring the said surface and the wheel together for the grinding operation, and a feed mechanism for resisting the said movement of the table caused by the pressing means, the feed mechanism consisting of a formed surface movable to permit the said movement of the table to take place in a predetermined manner.

29. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, a table slidable on the base for bringing about relative movement between the wheelhead and the workhead transversely of the said axis, means pressing the table to cause the movement of the table to bring the said surface and the wheel together for the grinding operation, a feed mechanism for restricting to predetermined amounts the said movement of the table caused by the pressing means to bring about feed-rate grinding, means operable on occasion to render the said feed mechanism inoperative so that the table movement is restricted only by the spring in the spindle and controlled-force grinding takes place, the said means bringing about relative movement between the wheelhead and the workhead in the direction of the said axis consisting of a rotatable means pressing against the wheelhead to bring about short oscillations thereof and an actuator for bringing about on occasion a relatively long movement.

30. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative movement between the wheelhead and the workhead in the direction of the axis of the surface of revolution, a second means bringing about relative movement between the wheelhead and the workhead transversely of the axis of the surface of revolution, means for dressing the wheelhead to give it a conical surface, the conical surface compensating for the spindle deflection during grinding, so that the surface elements of the wheel surface in the area of grinding are substantially parallel to the axis of the surface of revolution, a dressing mechanism located beside the path of the said movement in the direction of the surface of revolution, the mechanism having a dressing tool mounted for swinging movement from a first position adjacent the path to a second position away from the said path, and means separate from the swinging movement for advancing the dressing tool toward the said path, a compensating mechanism for bringing about an additional transverse movement on occasion, the compensating mechanism being capable of bringing about the said additional movement selectively at a slow speed or a relatively high speed.

31. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative movement between the wheelhead and the workhead in the direction of the axis of the surface of revolution, a second means bringing about relative movement between the wheelhead and the workhead transversely of the axis of the surface of revolution, means for dressing the abrasive wheel to give it a conical surface, the conical surface compensating for the spindle deflection during grinding, so that the surface elements of the wheel surface in the area of grinding are substantially parallel to the axis of the surface of revolution, the workhead comprising a rotating disc and a shoe having a generally flat contact surface, the edge of the disc and the said contact surface of the shoe defining a V which is symmetrical about a vertical line, a table on which the workhead is fastened, means providing for sliding movement of the table relative to the base in a direction transverse of the axis of the surface of revolution, means pressing the table to cause the said movement of the table to bring the said surface and the wheel together for the grinding operation, a feed mechanism for resisting the said movement of the table caused by the pressing means, the feed mechanism consisting of a formed surface movable to permit the said movement of the table to take place in a pre-determined manner, the workhead having a pressure member for contact with the workpiece at a point opposed to the points of contact with the disc and the shoe, resilient means biasing the pressure member toward a position of contact with the workpiece, means introducing the workpiece between the shoes and the pressure member to move the pressure member against the action of the resilient means until the workpiece is in place in contact with the shoes, and clamping means locking the pressure member in place against the workpiece only when the latter is in place in contact with the shoes, means operable on occasion to render the said feed mechanism operative so that the table movement is restricted only by the spring in the spindle and controlled-force grinding takes place, the wheelhead portion consisting of a lower part mounted on the base for sliding movement in the direction of the said axis and an upper part adapted to support and rotate a spindle with an abrasive wheel at its outer end, the upper part and the lower part being pivotally connected for relative swinging movement about a vertical axis, an actuator joining the upper and lower parts for bringing about the said swinging movement on occasion, the said means for bringing about relative movement between the wheelhead and the workhead in the direction of the said axis consisting of a rotatable means pressing against the wheelhead to bring about short oscillations thereof and an actuator for bringing about on occasion a relatively long movement, a dressing mechanism located beside the path of the said movement in the direction of the axis, the mechanism having a dressing tool mounted for swinging movement from a first position adjacent the path to a second position away from the said path, means separate from the swinging movement for advancing the dressing tool toward the said path, a compensating mechanism for bringing about an additional such transverse movement on occasion, the compensating mechanism being capable of bringing about the said additional movement selectively at a slow speed or at a relatively high speed.

32. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative reciprocatory movement between the wheelhead and the workhead in the direction of the axis of the surface of revolution, means bringing about relative movement between the wheelhead and the workhead transversely of the axis of the surface of revolution, means for dressing the abrasive wheel to give it a frusto-conical surface with the larger end outboard of the spindle, the conical surface compensating for the spindle deflection during grinding, so that the surface elements of the wheel surface in the area of grinding are substantially parallel to the axis of the surface of revolution, means for bringing about movement of the wheel past the dressing means in the direction of the said axis, means for inclining the spindle to the said axis during the dressing movement and returning it to a position during the grinding operation in which it would be parallel to the said axis in the absence of spindle deflection, supporting means mounted on the workhead and providing at least two points of contact with the workpiece, a pressure member in the form of a rotating disc for contacting with the workpiece at a point opposed to the above-mentioned points of contact, a strong spring and a weak spring in series biasing the pressure member toward a position of contact with the workpiece, means introducing the workpiece between the shoes and the pressure member to move the pressure member against the action of both springs until the workpiece is in place in contact with the shoes, means locking the weak spring so that it is ineffective when the pressure member is against the workpiece and the latter is in contact with the shoes, a table slidable on the base for bringing about relative movement between the wheelhead and the workhead transversely of the said axis, a cylinder and piston extending between the table and base in the direction of relative movement, a regulated-pressure source of fluid connected to the cylinder and piston to cause movement of the table to bring the said surface and the wheel together for the grinding operation, a feed mechanism for restricting to predetermined amounts the said movement of the table caused by the pressing means to bring about feed-rate grinding, means operable on occasion to render the said feed mechanism inoperative so that the table movement is restricted only by the spring in the spindle and controlled-force grinding takes place, and means for causing the said source to pass high-pressure fluid to the cylinder and piston during feed-rate grinding and to pass low-pressure fluid during controlled-force grinding.

33. A grinding machine for finishing a surface of revolution, comprising a base, a workhead mounted on the base for supporting and rotating the workpiece, a wheelhead also mounted on the base for supporting and rotating a spindle with an abrasive wheel at its outer end, means bringing about relative horizontal movement between the wheelhead and the workhead transversely of the axis of the surface of revolution, the workhead comprising a rotating disc and a shoe having a generally flat contact surface, the edge of the disc and the contact surface of the shoe defining a V symmetrical about a vertical line, the shoe having a loading finger which is movable along the line generally perpendicular to its contact surface from the operative position to an inoperative position, feed means introducing a workpiece into the path of the finger when it is away from the operative position, and a second rotating disc resiliently loaded to press against the upper portion of the workpiece when it is in position in contact with the first disc and the shoe, a table on which the workhead is fastened, means providing for sliding movement of the table relative to the base in a direction transverse of the axis of the surface of revolution, means pressing the table to cause the said movement of the table to bring the said surface and the wheel together for the grinding operation, a feed mechanism for resisting the said movement of the table caused by the pressing means, the feed mechanism consisting of a rotatable cam permitting the said movement of the table to take place in a predetermined manner, a motor for rotating the cam to permit the said table movement, a retraction means independent of the motor to rotate the cam in the opposite direction, and means independent of the cam for moving the table rapidly in the opposite direction.

34. A grinding machine for finishing a surface of revolution, comprising a base, a workhead mounted on the base for supporting and rotating a workpiece, a wheelhead also mounted on the base for supporting and rotating a spindle with an abrasive wheel at its outer end, means bringing about relative horizontal movement between the wheelhead and the workhead transversely of the axis of the surface of revolution, the workhead comprising a rotating disc and a shoe having a generally flat contact surface, the edge of the disc and the contact surface of the shoe defining a V symmetrical about a vertical line, the shoe having a loading finger which is movable along the line generally perpendicular to its contact surface from the operative position to an inoperative position, feed means introducing a workpiece into the path of the finger when it is away from the operative position, and a second rotating disc resiliently loaded to press against the upper portion of the workpiece when it is in position in contact with the first disc and the shoe, a strong spring and a weak spring in series biasing the second disc toward a position of contact with the workpiece, the finger introducing the workpiece between the shoes and the pressure member and the second disc to move the second disc against the action of both springs until the workpiece is in place in contact with the shoes, and means for locking the weak spring so that it is ineffective when the second disc is against the workpiece and the latter is in contact with the shoes.

35. A grinding machine for finishing a surface of revolution on a workpiece by abrasion, comprising a base, a workhead mounted on the base for supporting and rotating the workpiece about the axis of the surface of revolution, a wheelhead also mounted on the base for supporting and rotating a cantilever spindle with an abrasive wheel at its outer end, a first means bringing about relative reciprocatory movement between the wheelhead and the workhead in the direction of the axis of the surface of revolution, means bringing about relative movement between the wheelhead and the workhead transversely of the axis of the surface of revolution, and means for dressing the abrasive wheel to give it a frusto-conical surface with the larger end outboard of the spindle, the conical surface compensating for the spindle deflection during grinding, so that the surface elements of the wheel surface in the area of grinding are substantially parallel to the axis of the surfaces of revolution, means for bringing about movement of the wheel past the dressing means in the direction of the said axis, and means for inclining the spindle to the said axis during the dressing movement and returning it to a position during the grinding operation in which it would be parallel to the said axis in the absence of spindle deflection, the wheelhead being mounted on a wheelhead portion consisting of a lower part mounted on the base for sliding movement in the direction of the said axis and an upper part adapted to support and rotate the spindle with the abrasive wheel at its outer end, a means for dressing the abrasive wheel being mounted on the base, the upper part and the lower part of the wheelhead portion being pivotally connected for relative swinging movement about a vertical axis, and piston and cylinder joining the upper and lower parts for bringing about the said swinging movement from a first position wherein the undeflected spindle is parallel to the said axis to a second position wherein the undeflected spindle is at a predetermined angle to the axis for passage of the wheel by the dressing means to form a conical surface on the wheel.

36. A grinding machine for finishing a surface of revolution on a workpiece by abrasion, comprising a base, a workhead for supporting and rotating the workpiece about the axis of the surface of revolution, a wheelhead for supporting and rotating a spindle with an abrasive wheel mounted thereon, a feed mechanism for bringing about a pre-determined relative movement between the wheelhead and the workhead transversely of the said axis, a dressing mechanism, a compensating mechanism for bringing about an additional such transverse movement on occasion, the compensating mechanism being capable of bringing about the said additional movement selectively at a slow speed or at a relatively high speed, the compensating mechanism including a screw arrangement whose rotation causes the said additional transverse movement, a motor driving the said screw arrangement through a planetary gear arrangement, the planetary gear arrangement being directly connected to the screw arrangement, the motor being connected to the planetary gear arrangement for rapid movement in the opposite direction for reset, a piston and cylinder operative to make small incremental movements at slow speed through the planetary gear arrangement, and a clutch operative to lock a portion of the planetary gear arrangement against rotation except when the said incremental movements are taking place.

References Cited in the file of this patent

UNITED STATES PATENTS

| | | |
|---|---|---|
| 1,756,646 | Judge et al. | Apr. 29, 1930 |
| 1,904,045 | Haas | Apr. 18, 1933 |
| 2,442,683 | Green | June 1, 1948 |
| 2,457,743 | Stevens | Dec. 28, 1948 |
| 2,671,293 | Grobey | Mar. 9, 1954 |
| 2,834,160 | Lillie | May 13, 1958 |
| 2,839,874 | Maker | June 24, 1958 |